(12) United States Patent
Arimura et al.

(10) Patent No.: US 12,176,531 B2
(45) Date of Patent: Dec. 24, 2024

(54) LITHIUM-CONTAINING TRANSITION METAL COMPOSITE OXIDE, POSITIVE ELECTRODE ACTIVE MATERIAL FOR LITHIUM SECONDARY BATTERY, POSITIVE ELECTRODE FOR LITHIUM SECONDARY BATTERY, LITHIUM SECONDARY BATTERY, AND METHOD FOR MANUFACTURING LITHIUM-CONTAINING TRANSITION METAL COMPOSITE OXIDE

(71) Applicants: SUMITOMO CHEMICAL COMPANY, LIMITED, Tokyo (JP); TANAKA CHEMICAL CORPORATION, Fukui (JP)

(72) Inventors: Takashi Arimura, Tsukuba (JP); Kenji Takamori, Fukui (JP); Jun-Ichi Kageura, Niihama (JP); Yuichi Sato, Niihama (JP); Yusuke Maeda, Fukui (JP)

(73) Assignees: SUMITOMO CHEMICAL COMPANY, LIMITED, Tokyo (JP); TANAKA CHEMICAL CORPORATION, Fukui (JP)

( * ) Notice: Subject to any disclaimer, the term of this patent is extended or adjusted under 35 U.S.C. 154(b) by 0 days.

(21) Appl. No.: 18/490,447

(22) Filed: Oct. 19, 2023

(65) Prior Publication Data

US 2024/0047663 A1 Feb. 8, 2024

Related U.S. Application Data

(62) Division of application No. 16/767,023, filed as application No. PCT/JP2018/044194 on Nov. 30, 2018, now Pat. No. 11,855,247.

(30) Foreign Application Priority Data

Nov. 30, 2017 (JP) .................................. 2017-230733

(51) Int. Cl.
*H01M 4/505* (2010.01)
*H01M 4/02* (2006.01)
(Continued)

(52) U.S. Cl.
CPC ......... *H01M 4/505* (2013.01); *H01M 4/1391* (2013.01); *H01M 4/364* (2013.01);
(Continued)

(58) Field of Classification Search
CPC .... H01M 4/505; H01M 4/1391; H01M 4/364; H01M 4/525; H01M 10/0525; H01M 2004/021; H01M 2004/028; C01P 2002/74
See application file for complete search history.

(56) References Cited

U.S. PATENT DOCUMENTS

2003/0044684 A1 3/2003 Nanamoto et al.
2004/0265693 A1 12/2004 Kurachi
(Continued)

FOREIGN PATENT DOCUMENTS

CN 1306313 A 8/2001
CN 1947288 A 4/2007
(Continued)

OTHER PUBLICATIONS

Korean Office Action issued in corresponding Korean Patent Application No. 10-2020-7015099, dated Sep. 2, 2022, with English translation.
(Continued)

*Primary Examiner* — Brian R Ohara
*Assistant Examiner* — Emily Elizabeth Freeman
(74) *Attorney, Agent, or Firm* — Rimon P.C.

(57) ABSTRACT

This lithium-containing transition metal composite oxide includes secondary particles that are aggregates of primary
(Continued)

particles into or from which lithium ions are dopable or dedopable, and satisfies the following conditions:

(1) the lithium-containing transition metal composite oxide is represented by Formula (I), Li[Li$_x$(Ni$_{(1-y-z-w)}$Co$_y$Mn$_z$M$_w$)$_{1-x}$]O$_2$     (I)

(2) from X-ray photoelectron spectroscopy, a specific γ is calculated for each of the surface of the secondary particle and the inside of the secondary particle, and when the γ value of the surface of the secondary particle is referred to as γ1 and the γ value of the inside of the secondary particle is referred to as γ2, γ1 and γ2 satisfy the condition of Formula (II).

0.3≤γ1/γ2≤1.0     (II).

3 Claims, 3 Drawing Sheets

(51) Int. Cl.
*H01M 4/1391* (2010.01)
*H01M 4/36* (2006.01)
*H01M 4/525* (2010.01)
*H01M 10/0525* (2010.01)

(52) U.S. Cl.
CPC ....... *H01M 4/525* (2013.01); *H01M 10/0525* (2013.01); *C01P 2002/74* (2013.01); *H01M 2004/021* (2013.01); *H01M 2004/028* (2013.01)

(56) References Cited

U.S. PATENT DOCUMENTS

| | | | |
|---|---|---|---|
| 2006/0286457 | A1 | 12/2006 | Sasaki |
| 2007/0202405 | A1 | 8/2007 | Shizuka et al. |
| 2010/0209771 | A1 | 8/2010 | Shizuka et al. |
| 2011/0059367 | A1 | 3/2011 | Morita et al. |
| 2011/0281168 | A1 | 11/2011 | Watanabe et al. |
| 2012/0276446 | A1 | 11/2012 | Kawai |
| 2013/0119307 | A1 | 5/2013 | Watanabe et al. |
| 2014/0004423 | A1 | 1/2014 | Endo et al. |
| 2014/0154555 | A1 | 6/2014 | Endoh et al. |
| 2014/0186709 | A1 | 7/2014 | Iwanaga et al. |
| 2016/0276665 | A1 | 9/2016 | Ide et al. |
| 2017/0054147 | A1 | 2/2017 | Yokoyama et al. |
| 2017/0222211 | A1 | 8/2017 | Ryu et al. |
| 2018/0331362 | A1 | 11/2018 | Niwata et al. |
| 2019/0020023 | A1 | 1/2019 | Yokoyama et al. |

FOREIGN PATENT DOCUMENTS

| | | |
|---|---|---|
| CN | 101796672 A | 8/2010 |
| CN | 102024950 A | 4/2011 |
| CN | 102760872 A | 10/2012 |
| CN | 103515586 A | 1/2014 |
| CN | 103855422 A | 6/2014 |
| CN | 106797028 A | 5/2017 |
| JP | 2000-030693 A | 1/2000 |
| JP | 2001-332261 A | 11/2001 |
| JP | 2003-017054 A | 1/2003 |
| JP | 2004-327246 A | 11/2004 |
| JP | 2005-251700 A | 9/2005 |
| JP | 2007-242288 A | 9/2007 |
| JP | 2012-017253 A | 1/2012 |
| JP | 2015-228353 A | 12/2015 |
| JP | 2016-084279 A | 5/2016 |
| JP | 2016-115658 A | 6/2016 |
| JP | 2017-045632 A | 3/2017 |
| JP | 2017-084628 A | 5/2017 |
| JP | 2017-199561 A | 11/2017 |
| JP | 2017-201588 A | 11/2017 |
| WO | 2005/036680 A1 | 4/2005 |
| WO | 2013/015007 A1 | 1/2013 |
| WO | 2015/076376 A1 | 5/2015 |
| WO | 2016/038983 A1 | 3/2016 |

OTHER PUBLICATIONS

Extended European Search Report issued in corresponding European Patent Application No. 18884073.0-1108, dated Jul. 20, 2021.
International Search Report issued in corresponding International Patent Application No. PCT/JP2018/044194, dated Feb. 26, 2019, with English translation.
Japanese Notice of Reasons for Refusal issued in corresponding Japanese Patent Application No. 2017-230733, dated Jul. 3, 2018, with English translation.
European Notification Information Statement issued in corresponding European Patent Application No. 18884073.0-1108, dated Jul. 7, 2023.
Chinese Notification Information Statement issued in corresponding Chinese Patent Application No. 202211081176.5, dated Jun. 19, 2023, with partial English translation.
European Office Action issued in corresponding European Patent Application No. 18884073.0-1108, dated Mar. 2, 2023.
Office Action issued in Chinese Application No. 202211081176.5, mailed Sep. 5, 2023.
Chinese Office Action issued in corresponding Chinese Patent Application No. 201880076532.X, dated Jan. 13, 2022, with English translation.
Takaya et al. (WO 2006095594), a raw machine translation, Abstract, Sep. 14, 2006 (Year: 2006).
Takaya et al. (WO 2006095594), a raw machine translation, Detailed Description, Sep. 14, 2006 (Year: 2006).
Takaya et al. (WO 2006095594), original document, Sep. 14, 2006 (Year: 2006).
Li et al., Retarded phase transition by fluorine doping in Li-rich layered Li1.2Mn0.54Ni0.13Co0.13O2 cathode material, Journal of Power Sources, vol. 283, Jun. 1, 2015, pp. 162-170 (Year: 2015).
U.S. PTO Non-Final Office Action issued in related parent U.S. Appl. No. 16/787/023, dated Aug. 22, 2022.
U.S. PTO Final Office Action issued in related parent U.S. Appl. No. 16/787/023, dated Feb. 2, 2023.
U.S. PTO Notice of Allowance issued in related parent U.S. Appl. No. 16/787/023, dated Aug. 14, 2023.

LITHIUM-CONTAINING TRANSITION METAL COMPOSITE OXIDE, POSITIVE ELECTRODE ACTIVE MATERIAL FOR LITHIUM SECONDARY BATTERY, POSITIVE ELECTRODE FOR LITHIUM SECONDARY BATTERY, LITHIUM SECONDARY BATTERY, AND METHOD FOR MANUFACTURING LITHIUM-CONTAINING TRANSITION METAL COMPOSITE OXIDE

CROSS REFERENCE TO RELATED APPLICATIONS

This application is a Divisional of U.S. patent application Ser. No. 16/767,023, filed on May 26, 2020, which is the U.S. National Phase under 35 U.S.C. § 371 of International Application No. PCT/JP2018/044194, filed on Nov. 30, 2018, which claims the benefit of Japanese Application No. 2017-230733, filed on Nov. 30, 2017, the entire contents of each are hereby incorporated by reference.

TECHNICAL FIELD

The present invention relates to a lithium-containing transition metal composite oxide, a positive electrode active material for a lithium secondary battery, a positive electrode for a lithium secondary battery, a lithium secondary battery, and a method for manufacturing a lithium-containing transition metal composite oxide.

BACKGROUND ART

A lithium-containing transition metal composite oxide has been used as a positive electrode active material for a lithium secondary battery. Lithium secondary batteries have been already in practical use not only for small power sources in mobile phone applications, notebook personal computer applications, and the like but also for medium-sized or large-sized power sources in automotive applications, power storage applications, and the like.

In order to further expand the applications of lithium secondary batteries, there is a demand for lithium secondary batteries having higher capacity and excellent output characteristics.

For the purpose of improving battery characteristics such as high capacity and output characteristics, for example, Patent Literature 1 describes a technique that focuses on the state of the surface of secondary particles of a lithium nickel composite oxide. In the method described in Patent Literature 1, a positive electrode active material for a lithium secondary battery in which an oxygen 1s spectrum and a carbon Is spectrum of X-ray photoelectron spectroscopy (XPS) are in specific ranges is described.

Patent Literature 2 defines the ratio of the number of lithium atoms to the number of nickel atoms on the surface of a positive electrode active material and in the vicinity thereof.

CITATION LIST

Patent Literature

[Patent Literature 1] Japanese Unexamined Patent Application, First Publication No. 2004-327246
[Patent Literature 2] Japanese Unexamined Patent Application, First Publication No. 2016-115658

SUMMARY OF INVENTION

Technical Problem

In order to further improve the output characteristics of the lithium secondary battery, the methods described in Patent Literatures 1 and 2 have room for further improvement.

The present invention has been made in view of such circumstances, and an object thereof is to provide a lithium-containing transition metal composite oxide for a lithium secondary battery having good output characteristics. Another object is to provide a positive electrode active material for a lithium secondary battery having the lithium-containing transition metal composite oxide, a positive electrode using the positive electrode active material for a lithium secondary battery, a lithium secondary battery, and a method for manufacturing a lithium-containing transition metal composite oxide.

Solution to Problem

The present invention includes the following [1] to [11].

[1] A lithium-containing transition metal composite oxide including: secondary particles that are aggregate of primary particles into or from which lithium ions are dopable or dedopable, in which the lithium-containing transition metal composite oxide satisfies the following conditions, (1) the lithium-containing transition metal composite oxide is represented by Formula (I), $$Li[Li_x(Ni_{1-y-z-w}Co_yMn_zM_w)_{1-x}]O_2 \qquad (I)$$

(in Formula (I), $0 \leq x \leq 0.2$, $0 < y \leq 0.5$, $0 \leq z \leq 0.8$, $0 \leq w \leq 0.1$, and $y+z+w<1$ are satisfied, and M represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.)

(2) when an area value of a peak appearing at 53.8 eV in a lithium 1s spectrum is referred to as α and an area value of a peak appearing at 529.0 eV in an oxygen 1s spectrum is referred to as β when X-ray photoelectron spectroscopy is performed, and a ratio between α and β is referred to as γ (α/β=γ), γ is calculated for each of a surface of the secondary particle and an inside of the secondary particle, and when a γ value of the surface of the secondary particle is referred to as γ1 and a γ value of the inside of the secondary particle is referred to as γ2, γ1 and γ2 satisfy a condition of Formula (II).

$$0.3 \leq \gamma1/\gamma2 \leq 1.0 \qquad (II)$$

[2] The lithium-containing transition metal composite oxide according to [1], in which an element ratio R (Li (Atom %)/O (Atom %)) calculated from the peak appearing at 53.8 eV in the lithium 1s spectrum and the peak appearing at 529.0 eV in the oxygen 1s spectrum when the X-ray photoelectron spectroscopy is performed is $0.4 \leq R \leq 0.8$ in the inside of the secondary particle.

[3] The lithium-containing transition metal composite oxide according to [1] or [2], in which a BET specific surface area (m2/g) is 0.1 or more and 3.0 or less.

[4] The lithium-containing transition metal composite oxide according to any one of [1] to [3], in which a crystallite size L003 at a peak within a range of $2\theta=18.7\pm1°$ in a powder X-ray diffraction measurement using CuKα radiation is 400 Å or more and 1300 Å or less.

[5] The lithium-containing transition metal composite oxide according to any one of [1] to [4], in which a 50% cumulative volume particle size D50 (μm) is 3 or more and 20 or less, and a difference between a maximum particle diameter Dmax and a minimum particle size Dmin (μm) is D50×⅔ or more.

[6] The lithium-containing transition metal composite oxide according to any one of [1] to [5], in which, in Formula (I), 0<x≤0.2 is satisfied.

[7] A positive electrode active material for a lithium secondary battery, including: the lithium-containing transition metal composite oxide according to any one of [1] to [6].

[8] A positive electrode for a lithium secondary battery, including: the positive electrode active material for a lithium secondary battery according to [7].

[9] A lithium secondary battery including: the positive electrode for a lithium secondary battery according to [8].

[10] A method for manufacturing a lithium-containing transition metal composite oxide including secondary particles that are aggregates of primary particles into or from which lithium ions are dopable or dedopable and represented by General Formula (I), the method including: a mixing step of mixing a lithium compound and a metal composite compound containing at least nickel to obtain a mixture; a calcining step of calcining the mixture to obtain a calcined product; and a washing step of washing the calcined product, in which, in the mixing step, mixing is performed so that a molar ratio (Li/Me, a molar ratio of lithium to a total amount of metal elements excluding lithium) between lithium contained in the lithium compound and metal elements in the metal composite compound containing at least nickel exceeds 1, and in the washing step, a temperature of a washing solution used for washing is set to −20° C. or higher and 40° C. or lower, and washing is performed in an amount of the washing solution used for washing such that a concentration of lithium carbonate in the washing solution in a case where it is assumed that a total amount of residual lithium carbonate contained in the calcined product before washing is dissolved in the washing solution is ⅒ or more and 3 or less times a solubility of lithium carbonate in the washing solution at the temperature of the washing solution during the washing step.

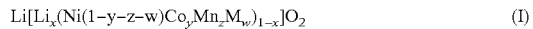

(in Formula (I), 0≤x≤0.2, 0<y≤0.5, 0≤z≤0.8, 0≤w≤0.1, and y+z+w<1 are satisfied, and M represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.)

[1] A method for manufacturing a lithium-containing transition metal composite oxide including secondary particles that are aggregates of primary particles into or from which lithium ions are dopable or dedopable and represented by General Formula (I), the method including: a mixing step of mixing a lithium compound and a metal composite compound containing at least nickel to obtain a mixture; a calcining step of calcining the mixture to obtain a calcined product; and a washing step of washing the calcined product, in which, in the mixing step, mixing is performed so that a molar ratio (Li/Me, a molar ratio of lithium to a total amount of metal elements excluding lithium) between lithium contained in the lithium compound and metal elements in the metal composite compound containing at least nickel exceeds 1, and in the washing step, a temperature of a slurry containing the calcined product and a washing solution used for washing is maintained at −20° C. or higher and lower than 10° C., and washing is performed in an amount of the washing solution used for washing such that a concentration of lithium carbonate in the washing solution in a case where it is assumed that a total amount of residual lithium carbonate contained in the calcined product before washing is dissolved in the washing solution is ⅒ or more and 3 or less times a solubility of lithium carbonate in the washing solution at the temperature of the washing solution during the washing step.

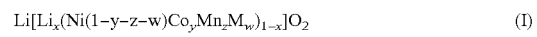

(in Formula (I), 0≤x≤0.2, 0<y≤0.5, 0≤z≤0.8, 0≤w≤0.1, and y+z+w<1 are satisfied, and M represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.)

[12] A method for manufacturing a lithium-containing transition metal composite oxide, including secondary particles that are aggregates of primary particles into or from which lithium ions are dopable or dedopable and represented by General Formula (I), the method including: a mixing step of mixing a lithium compound and a metal composite compound containing at least nickel to obtain a mixture; a calcining step of calcining the mixture to obtain a calcined product; and a washing step of washing the calcined product, in which, in the mixing step, mixing is performed so that a molar ratio (Li/Me, a molar ratio of lithium to a total amount of metal elements excluding lithium) between lithium contained in the lithium compound and metal elements in the metal composite compound containing at least nickel exceeds 1, and in the washing step, a temperature of a washing solution used for washing is set to −20° C. or higher and 40° C. or lower, washing is performed in an amount of the washing solution used for washing such that a concentration of lithium carbonate in the washing solution in a case where it is assumed that a total amount of residual lithium carbonate contained in the calcined product before washing is dissolved in the washing solution is ⅒ or more and 3 or less times a solubility of lithium carbonate in the washing solution at the temperature of the washing solution during the washing step, and a temperature of a slurry containing the calcined product and the washing solution used for washing is maintained at −20° C. or higher and lower than 10° C.

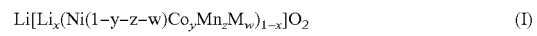

(in Formula (I), 0≤x≤0.2, 0<y≤0.5, 0≤z≤0.8, 0≤w≤0.1, and y+z+w<1 are satisfied, and M represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.)

Advantageous Effects of Invention

According to the present invention, it is possible to provide a lithium-containing transition metal composite oxide for a lithium secondary battery having good output characteristics. In addition, it is possible to provide a positive electrode active material for a lithium secondary battery having the lithium-containing transition metal composite oxide, a positive electrode using the positive electrode active material for a lithium secondary battery, a lithium secondary battery, and a method for manufacturing a lithium-containing transition metal composite oxide.

DESCRIPTION OF EMBODIMENTS

<Lithium-Containing Transition Metal Composite Oxide>

Figure 1A:
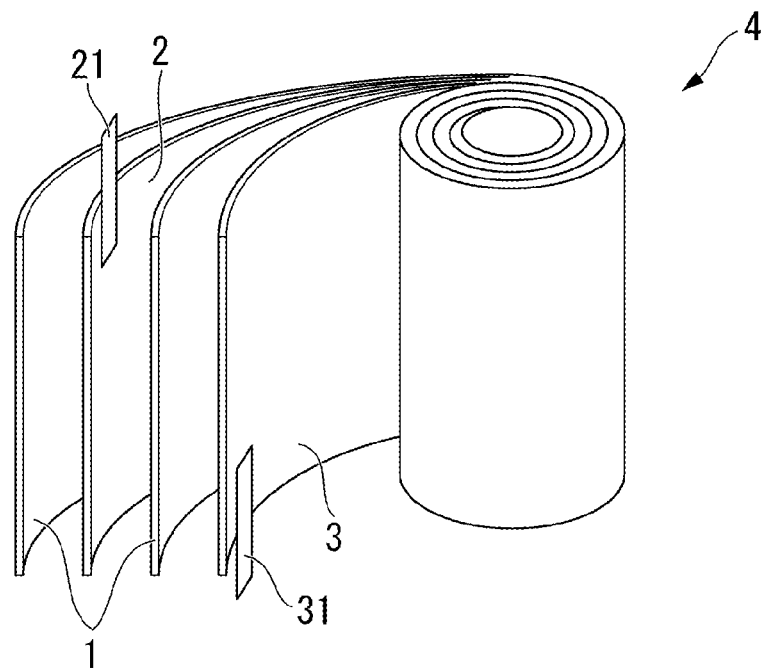
FIG. 1A is a schematic configuration view illustrating an example of a lithium-ion secondary battery.

A lithium-containing transition metal composite oxide of the present embodiment includes secondary particles that are aggregates of primary particles into or from which lithium ions are dopable or dedopable. The lithium-containing transition metal composite oxide of the present embodiment satisfies the following requirements (1) and (2). Requirements (1) and (2) will be described.

<<Requirement (1)>>

The lithium-containing transition metal composite oxide of the present embodiment is represented by Formula (I).

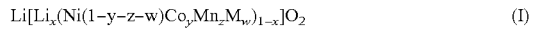

$$Li[Li_x(Ni_{(1-y-z-w)}Co_yMn_zM_w)_{1-x}]O_2 \qquad (I)$$

(in Formula (I), $0 \leq x \leq 0.2$, $0 < y \leq 0.5$, $0 \leq z \leq 0.8$, $0 \leq w \leq 0.1$, and $y+z+w<1$ are satisfied, and M represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.)

From the viewpoint of obtaining a lithium secondary battery having high cycle characteristics, x in Formula (I) is preferably more than 0, more preferably 0.01 or more, and even more preferably 0.02 or more. In addition, from the viewpoint of obtaining a lithium secondary battery having higher initial Coulombic efficiency, x in Formula (I) is preferably 0.1 or less, more preferably 0.08 or less, and even more preferably 0.06 or less.

The upper limit and the lower limit of x can be arbitrarily combined.

For example, x is preferably more than 0 and 0.1 or less, more preferably 0.01 or more and 0.08 or less, and even more preferably 0.02 or more and 0.06 or less.

In the present specification, "having high cycle characteristics" means that the discharge capacity retention ratio is high.

In addition, from the viewpoint of obtaining a lithium secondary battery having high cycle characteristics, y in Formula (I) is preferably 0.005 or more, more preferably 0.01 or more, and even more preferably 0.05 or more. In addition, from the viewpoint of obtaining a lithium secondary battery having high thermal stability, y in Formula (I) is preferably 0.4 or less, more preferably 0.35 or less, and even more preferably 0.33 or less.

The upper limit and the lower limit of y can be arbitrarily combined.

For example, y is preferably 0.005 or more and 0.4 or less, more preferably 0.01 or more and 0.35 or less, and even more preferably 0.05 or more and 0.33 or less.

In addition, from the viewpoint of obtaining a lithium secondary battery having high cycle characteristics, z in Formula (I) is preferably 0.01 or more, and more preferably 0.03 or more. In addition, from the viewpoint of obtaining a lithium secondary battery having high storage characteristics at high temperatures (for example, in an environment at 60° C.), z in Formula (I) is preferably 0.4 or less, more preferably 0.38 or less, and even more preferably 0.35 or less.

The upper limit and the lower limit of z can be arbitrarily combined.

For example, z is preferably 0.01 or more and 0.4 or less, and more preferably 0.03 or more and 0.38 or less.

In addition, from the viewpoint of obtaining a lithium secondary battery having low battery resistance, w in Formula (I) is preferably more than 0, more preferably 0.0005 or more, and even more preferably 0.001 or more. In addition, from the viewpoint of obtaining a lithium secondary battery having a high discharge capacity at a high current rate, w in Formula (I) is preferably 0.09 or less, more preferably 0.08 or less, and even more preferably 0.07 or less.

The upper limit and the lower limit of w can be arbitrarily combined.

For example, w is preferably more than 0 and 0.09 or less, more preferably 0.0005 or more and 0.08 or less, and even more preferably 0.001 or more and 0.07 or less.

In addition, from the viewpoint of obtaining a lithium secondary battery having high cycle characteristics, M in Formula (I) is preferably one or more metals selected from the group consisting of Ti, Mg, Al, W, B, and Zr, and more preferably one or more metals selected from the group consisting of Al, W, B, and Zr.

<<Requirement (2)>>

The lithium-containing transition metal composite oxide of the present embodiment satisfies Formula (II).

$$0.3 \leq \gamma 1/\gamma 2 \leq 1.0 \qquad (II)$$

In Formula (II), γ1 and γ2 are values calculated by the following method.

When the lithium-containing transition metal composite oxide is subjected to X-ray photoelectron spectroscopy, the area value of the peak appearing at 53.8 eV in a lithium 1s spectrum is referred to as α, and the area value of the peak appearing at 529.0 eV in an oxygen 1s spectrum is referred to as β. The ratio between α and β is referred to as γ (α/β=γ).

For each of the surface of the secondary particles and the inside of the secondary particles, γ is calculated. The γ value of the surface of the secondary particles is referred to as γ1, and the γ value of the inside of the secondary particles is referred to as γ2.

Measurement of γ1

Figure 2:
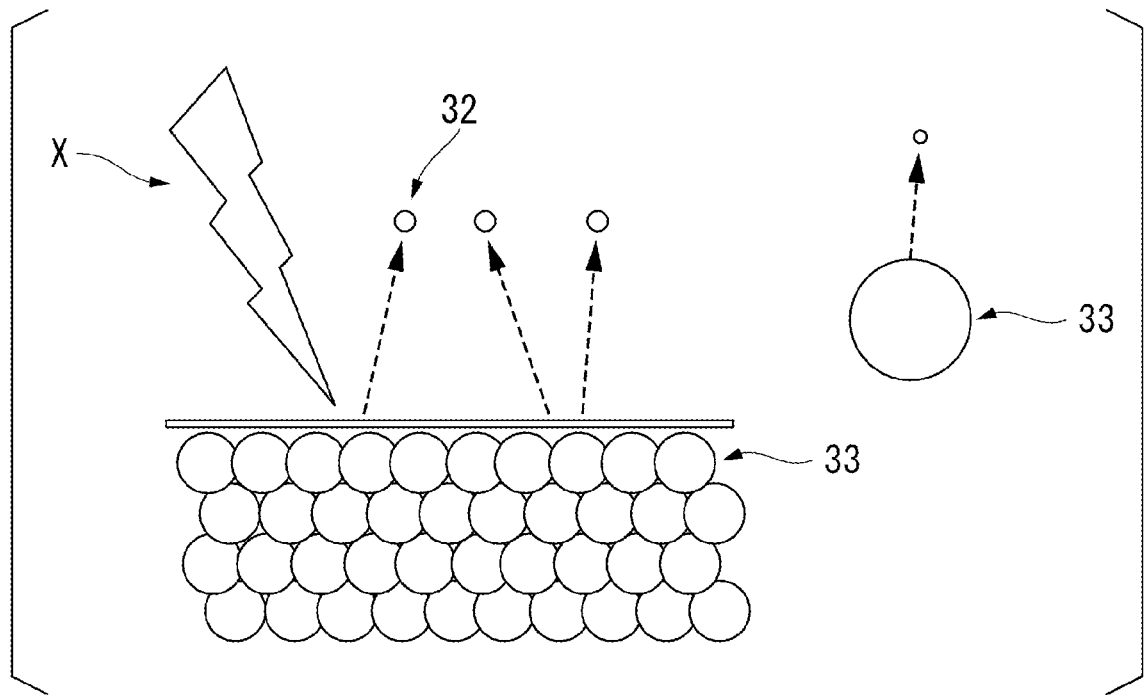
FIG. 2 is a schematic view illustrating a definition of a surface of a secondary particle in the present embodiment.

In the present embodiment, referring to FIG. 2, the "γ value (γ1) of the surface of the secondary particle" is a value calculated when the surface of secondary particles 33 of the lithium-containing transition metal composite oxide is subjected to X-ray photoelectron spectroscopy (XPS). That is, the γ value (γ1) is a value obtained by irradiating the secondary particles with an X-ray indicated by reference numeral X and measuring photoelectrons 32 generated from the surface of the secondary particles. In the present invention, the surface of the secondary particles generally means a region with a depth of about 10 nm from the surface of the secondary particles of the lithium-containing transition metal composite oxide toward the center. In a case where no peak appears at a position of 53.8 eV in the lithium 1s spectrum or at a position of 529.0 eV in the oxygen 1s spectrum due to the presence of impurities and a coating layer on the surface of the secondary particles of the lithium-containing transition metal composite oxide and γ1 cannot be calculated, the impurities and the coating layer on the surface of the secondary particles of the lithium-containing transition metal composite oxide may be removed by performing sputtering as appropriate. The sputtering conditions may be appropriately adjusted so as to remove only the impurities and the coating layer on the surface of the secondary particles and not to remove the lithium-containing transition metal composite oxide present thereunder.
Measurement of γ2

Figure 3:
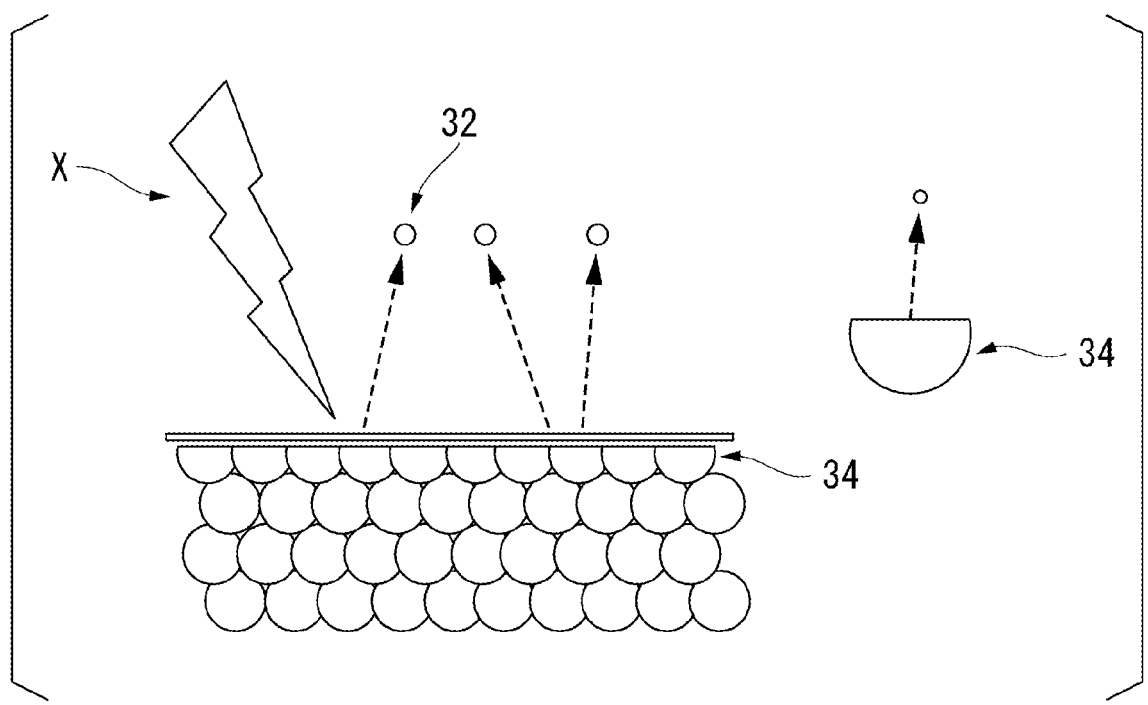
FIG. 3 is a schematic view illustrating a definition of an inside of a secondary particle according to the present embodiment.

Referring to FIG. 3, the "γ value (γ2) of the inside of the secondary particles" is a value calculated when the surface of secondary particles 34 that had undergone a treatment to expose the inside thereof by sputtering of the secondary particles of the lithium-containing transition metal composite oxide from the surface toward the center portion is subjected to XPS. That is, the γ value (γ2) is a value obtained by irradiating the secondary particles having the exposed inside with an X-ray indicated by reference numeral X and measuring photoelectrons 32 generated from the surface of the secondary particles. In the present invention, regarding the inside of the secondary particles, a region in which the γ value does not change after sufficient sputtering is referred to as the inside of the secondary particles, and the value in this case is referred to as γ2.

[Analysis of XPS in Depth Direction]

In order to calculate β2, XPS measurement of the inside of the secondary particles is performed as follows. Inside an XPS apparatus, Ar ion sputtering is performed on the secondary particles under the same conditions as those for sputtering to a depth of 10 nm when a $SiO_2$ film is to be sputtered. Thereafter, XPS measurement is performed on the exposed region. Again, Ar ion sputtering is performed at the same location under the same conditions as those for sputtering to a depth of 10 nm when the $SiO_2$ film is to be sputtered. Thereafter, the XPS measurement is performed again at the same point. This operation is repeated, and the value when no change occurs in the γ value is referred to as γ2.

Measurement of α and β

The lithium-containing transition metal composite oxide is analyzed by XPS, and the area value α of the peak appearing at 53.8 eV in the lithium 1s spectrum and the area value β of the peak appearing at 529.0 eV in the oxygen 1s spectrum are measured.

Then, the ratio γ (α/β) between α and β is calculated. Lithium contained in the lithium-containing transition metal composite oxide represented by Formula (I) has a peak at a position where the binding energy is about 53.8 eV in XPS. That is, "53.8 eV" in the present specification is sufficient if it can be determined that the peak is based on lithium included in the lithium-containing transition metal composite oxide according to the present invention, and can be usually 53.8 eV±0.5 eV.

On the other hand, oxygen contained in the lithium-containing transition metal composite oxide represented by Formula (I) has a peak at a position where the binding energy is about 529.0 eV in XPS. That is, "529.0 eV" in the present specification is sufficient if it can be determined that the peak is based on oxygen included in the lithium-containing transition metal composite oxide according to the present invention, and can be usually 529.0 eV±1 eV.

Lithium derived from lithium carbonate, lithium hydroxide, or lithium oxide has a peak at a position where the binding energy is about 55.0 eV in XPS. That is, "55.0 eV" in the present specification is sufficient if it can be determined that the peak is based on lithium included in lithium carbonate, lithium hydroxide, or lithium oxide, and can be usually 55.0 eV±0.5 eV.

In addition, oxygen derived from lithium carbonate, lithium hydroxide, and lithium oxide has a peak at a position where the binding energy is about 531.1 eV in XPS. "531.1 eV" in the present specification is sufficient if it can be determined that the peak is based on oxygen included in lithium carbonate, lithium hydroxide, or lithium oxide, and can be usually 531.1 eV±1 eV. Therefore, the peak can be distinguished from the peaks of lithium and oxygen contained in the lithium-containing transition metal composite oxide.

Therefore, even in a case where lithium carbonate, lithium hydroxide, or lithium oxide and the lithium-containing transition metal composite oxide are mixed, the area value α and the area value β can be calculated by appropriately performing waveform separation by peak fitting.

In addition, as necessary, the area value α and the area value β can be calculated by performing waveform separation by peak fitting on the lithium 1s spectrum peak and the oxygen 1s spectrum peak obtained by XPS.

The ratio γ (α/β) between α and β represents the ratio of the peak area corresponding to the number of lithium atoms contained in the lithium-containing transition metal composite oxide to the peak area corresponding to the number of oxygen atoms of the lithium-containing transition metal composite oxide. That is, the fact that γ is small means that the ratio of lithium contained in the lithium-containing transition metal composite oxide is small. That is, the fact that γ1 is small means that the ratio of lithium contained in the surface of the secondary particles of the lithium-containing transition metal composite oxide is small. The fact that γ2 is small means that the ratio of lithium contained in the inside of the secondary particles of the lithium-containing transition metal composite oxide is small.

In the present embodiment, γ1/γ2 is 0.3 or more, preferably 0.5 or more, more preferably 0.6 or more, and particularly preferably 0.65 or more. In addition, γ1/γ2 is 1.0 or less, preferably 0.95 or less, more preferably 0.9 or less, and particularly preferably 0.85 or less.

The upper limit and the lower limit thereof can be arbitrarily combined.

For example, γ1/γ2 is preferably 0.3 or more and 0.95 or less, more preferably 0.5 or more and 0.95 or less, even more preferably 0.6 or more and 0.9 or less, and particularly preferably 0.65 or more and 0.85 or less.

The lithium-containing transition metal composite oxide of the present embodiment that satisfies requirement (2) is characterized in that the concentration gradient of lithium from the inside of the secondary particles to the surface of the secondary particles is small.

In the present embodiment, "concentration gradient" means that the lithium content in the lithium-containing transition metal composite oxide decreases from the inside of the secondary particles toward the surface of the secondary particles.

When the concentration gradient of lithium toward the surface of the secondary particles is small, insertion and desorption of lithium proceed efficiently, and a lithium secondary battery having excellent discharge rate characteristics can be provided.

Contrary to this, in the lithium-containing transition metal composite oxide having a large lithium concentration gradient toward the surface of the secondary particles, a region having a low lithium content is formed on the surface of the secondary particles. In this case, it is presumed that the region having a low lithium content is a factor that hinders the insertion and desorption of lithium, and battery characteristics are considered to be inferior.

<<Element Ratio R (Li (Atom %)/O (Atom %))>>

In the lithium-containing transition metal composite oxide of the present embodiment, the element ratio R (Li (Atom %)/O (Atom %)) calculated from the peak appearing at 53.8 eV in the lithium 1s spectrum and the peak appearing at 529.0 eV in the oxygen 1s spectrum when X-ray photoelectron spectroscopy is performed preferably satisfies $0.4 \leq R \leq 0.8$ in the inside of the secondary particles.

As necessary, by performing waveform separation by peak fitting on the lithium 1s spectrum peak and the oxygen 1s spectrum peak obtained by XPS, the peak areas of the peak appearing at 53.8 eV in the lithium 1s spectrum and the peak appearing at 529.0 eV in the oxygen 1s spectrum can be calculated. Furthermore, by multiplying each of the peak areas by a relative sensitivity factor, the values of Li (Atom %) and O (Atom %) are obtained, and the value of R can be calculated.

In the present embodiment, the element ratio R is more preferably 0.45 or more, and particularly preferably 0.5 or more. In addition, the element ratio R is more preferably 0.75 or less, and particularly preferably 0.7 or less.

The upper limit and the lower limit thereof can be arbitrarily combined.

For example, the element ratio R is preferably 0.45 or more and 0.7 or less, and more preferably 0.5 or more and 0.7 or less.

When the element ratio R is within the above specific range, this means that the formation of lithium carbonate, lithium hydroxide, and lithium oxide, which are factors that hinder the insertion and desorption of lithium into and from the secondary particles, is suppressed. When a large amount of lithium carbonate, lithium hydroxide and lithium oxide are formed on the surface of the secondary particles, the peak derived from the lithium-containing transition metal composite oxide during analysis by XPS becomes small, and the element ratio R deviates from the above specific range. That is, when the element ratio R is within the above specific range, it is possible to provide a lithium-containing transition metal composite oxide for a lithium secondary battery in which a decrease in output characteristics is suppressed.

<<BET Specific Surface Area>>

In the present embodiment, from the viewpoint of obtaining a lithium secondary battery having a high discharge capacity at a high current rate, the BET specific surface area (m²/g) of the lithium-containing transition metal composite oxide is preferably 0.1 or more, preferably 0.12 or more, and more preferably 0.15 or more. In addition, from the viewpoint of improving handling properties, the BET specific surface area is preferably 3 or less, more preferably 2.8 or less, and even more preferably 2.5 or less.

The upper limit and the lower limit of the BET specific surface area (m²/g) can be arbitrarily combined. For example, the BET specific surface area (m²/g) is preferably 0.1 or more and 3 or less, more preferably 0.12 or more and 2.8 or less, even more preferably 0.15 or more and 2.5 or less, and particularly preferably 0.1 or more and 2.0 or less.

In the measurement of the BET specific surface area, nitrogen gas is used as an adsorption gas. For example, the BET specific surface area is a value obtained by drying 1 g of a powder of a measurement object in a nitrogen atmosphere at 105° C. for 30 minutes, and measuring the powder using a BET specific surface area meter (for example, Macsorb (registered trademark) manufactured by MOUNTECH Co., Ltd.).

<<Crystallite Size>>

In the lithium-containing transition metal composite oxide of the present embodiment, it is preferable that a crystallite size $L_{003}$ (Å) at a peak (hereinafter, sometimes referred to as peak A) within a range of $2\theta=18.7\pm1°$ in powder X-ray diffraction measurement using CuKα radiation be 400 or more and 1300 or less.

From the viewpoint of obtaining a lithium secondary battery having a large charge capacity, the crystallite size $L_{003}$ (Å) is preferably 500 or more, more preferably 550 or more, and even more preferably 600 or more.

In addition, from the viewpoint of obtaining a lithium secondary battery having high cycle characteristics, the crystallite size $L_{003}$ (Å) is preferably 1000 or less, more preferably 900 or less, and even more preferably 850 or less.

The upper limit and the lower limit of $L_{003}$ (Å) can be arbitrarily combined.

For example, $L_{003}$ (Å) is preferably 500 or more and 1000 or less, more preferably 550 or more and 900 or less, and even more preferably 600 or more and 850 or less.

The crystallite size $L_{003}$ (Å) at the peak A of the lithium-containing transition metal composite oxide of the present embodiment can be confirmed as follows.

First, the lithium-containing transition metal composite oxide of the present embodiment is subjected to powder X-ray diffraction measurement using CuKα as a radiation source in a diffraction angle 2θ measurement range of 10° or more and 90° or less, and a peak corresponding to the peak A is determined. Furthermore, the half-width of the determined peak is calculated, and the crystallite size can be calculated by using the Scherrer equation $L=K\lambda/B \cos\theta$ (L: crystallite size, K: Scherrer constant, λ: X-ray wavelength B: peak half-width, θ: Bragg angle). Calculation of a crystallite size by the above equation is a method hitherto used (for example, refer to "X-ray structure analysis-determine arrangement of atoms" issued Apr. 30, 2002, Third Edition, Yoshio Waseda, Matsubara Eiichiro). Hereinafter, a case where a positive electrode active material for a lithium secondary battery has a hexagonal crystal structure belonging to the space group R-3m will be described as an example in more detail with reference to the drawings.

Figure 4A:
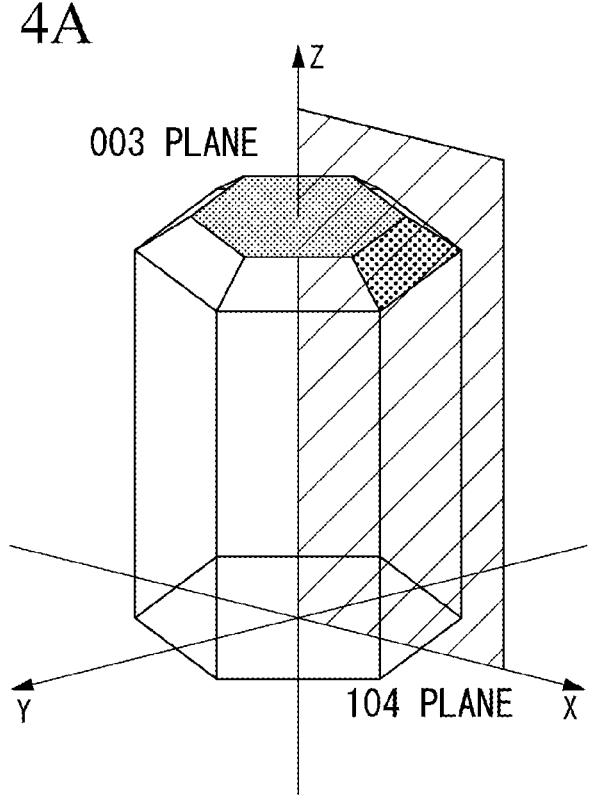
FIG. 4A is a schematic view describing a crystallite size in the present invention.
Figure 4B:
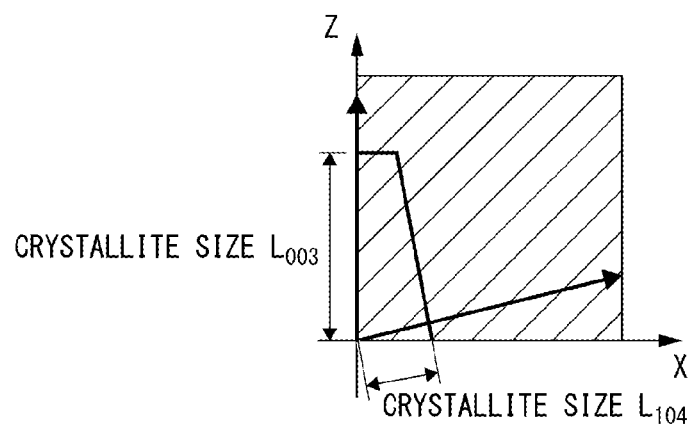
FIG. 4B is a schematic view describing a crystallite size in the present invention.

FIG. 4A illustrates a schematic view of the 003 plane in a crystallite. In FIG. 4A, the crystallite size in a direction perpendicular to the 003 plane corresponds to the crystallite size $L_{003}$ (Å) (FIG. 4B).

<<50% Cumulative Volume Particle Size>>

In terms of suppressing moisture adsorption, the 50% cumulative volume particle size $D_{50}$ (μm) of the lithium-containing transition metal composite oxide of the present embodiment is preferably 3 or more, more preferably 5 or more, and particularly preferably 7 or more. In addition, in terms of improving handling properties, $D_{50}$ (μm) is preferably 20 or less, more preferably 18 or less, and particularly preferably 15 or less.

The upper limit and the lower limit of $D_{50}$ (μm) can be arbitrarily combined. For example, $D_{50}$ (μm) is preferably 3 or more and 20 or less, more preferably 5 or more and 18 or less, and even more preferably 7 or more and 15 or less.

$D_{50}$ (μm) of the lithium-containing transition metal composite oxide can be measured, for example, as follows. 0.1 g of the powder of the lithium-containing transition metal composite oxide to be measured is poured into 50 ml of 0.2 mass % sodium hexametaphosphate aqueous solution to obtain a dispersion solution in which the powder is dispersed. The particle size distribution of the obtained dispersion solution is measured using Mastersizer 2000 manufactured by Malvern Instruments Ltd. (laser diffraction scattering particle size distribution measuring device) to obtain a volume-based cumulative particle size distribution curve. In the obtained cumulative particle size distribution curve, the volume particle size at a 50% cumulative point is referred to as the 50% cumulative volume particle size $D_{50}$ of the lithium-containing transition metal composite oxide.

In addition, in the obtained cumulative particle size distribution curve, the maximum volume particle size is referred to as $D_{max}$, and the minimum volume particle size is referred to as $D_{min}$.

Furthermore, in terms of enhancing processability during the production of a positive electrode, the difference between the maximum particle diameter $D_{max}$ and the minimum particle size $D_{min}$ (μm) of the lithium-containing transition metal composite oxide of the present embodiment is preferably $D_{50} \times 2/3$ or more.

<Method For Manufacturing Lithium-Containing Transition Metal Composite Oxide>

<<Method 1 For Manufacturing Lithium-Containing Transition Metal Composite Oxide>>

A method 1 for manufacturing the lithium-containing transition metal composite oxide of the present invention (hereinafter, referred to as "manufacturing method 1") includes a mixing step of mixing a lithium compound and a metal composite compound containing at least nickel to obtain a mixture, a calcining step of calcining the mixture to obtain a calcined product, and a washing step of washing the calcined product, as essential steps.

In the mixing step, mixing is performed so that the molar ratio (Li/Me, the molar ratio of lithium to the total amount of metal elements excluding lithium) between lithium contained in the lithium compound and metal elements in the metal composite compound containing at least nickel exceeds 1.

In manufacturing method 1, in the washing step, the temperature of the washing solution used for washing is set to −20° C. or higher and 40° C. or lower, and washing is performed in an amount of the washing solution used for washing such that the concentration of lithium carbonate in the washing solution in a case where it is assumed that the total amount of residual lithium carbonate contained in the calcined product before washing is dissolved in the washing solution is 1/10 or more and 3 or less times the saturated solubility of lithium carbonate in the washing solution at the temperature of the washing solution.

In manufacturing the lithium-containing transition metal composite oxide of the present invention, it is preferable that, first, a metal composite compound including metals other than lithium, that is, Ni and Co which are essential metals, and at least one of Mn and M which are optional metals (M is any one or more of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn (that is, a metal composite compound containing nickel)) be prepared, the metal composite compound be mixed with an appropriate lithium compound, and this mixture be calcined. The optional metal is a metal optionally contained in the metal composite compound as desired, and the optional metal may not be contained in the metal composite compound in some cases. As the metal composite compound, a metal composite hydroxide or a metal composite oxide is preferable. Hereinafter, an example of the method for manufacturing the lithium-containing transition metal composite oxide will be described by separately describing a step of manufacturing the metal composite compound and a step of manufacturing the lithium-containing transition metal composite oxide.

(Step of Manufacturing Metal Composite Compound)

The metal composite compound can be produced by a generally known batch coprecipitation method or continuous coprecipitation method. Hereinafter, the manufacturing method will be described in detail, taking a metal composite hydroxide, which is a metal composite compound containing nickel, cobalt, manganese, and aluminum as metals, as an example.

First, a nickel salt solution, a cobalt salt solution, a manganese salt solution, an aluminum salt solution, and a complexing agent are reacted by a coprecipitation method, particularly a continuous method described in Japanese Unexamined Patent Application, First Publication No. 2002-201028, to manufacture a nickel cobalt manganese aluminum composite hydroxide.

A nickel salt which is a solute of the nickel salt solution is not particularly limited, and for example, any of nickel sulfate, nickel nitrate, nickel chloride, and nickel acetate can be used. As a cobalt salt which is a solute of the cobalt salt solution, for example, any of cobalt sulfate, cobalt nitrate, cobalt chloride, and cobalt acetate can be used. As a manganese salt which is a solute of the manganese salt solution, for example, any of manganese sulfate, manganese nitrate, manganese chloride, and manganese acetate can be used. As aluminum salt which is a solute of the aluminum salt solution, aluminum sulfate can be used. The above metal salts are used in proportions corresponding to the composition ratio of Formula (I). That is, the metal salts are used in proportions of nickel salt:cobalt salt:manganese salt:aluminum salt=(1−y−z−w):y:z:w. Also, water is used as a solvent.

The complexing agent is capable of forming a complex with ions of nickel, cobalt, manganese, and aluminum in an aqueous solution, and examples thereof include ammonium ion donors (ammonium hydroxide, ammonium sulfate, ammonium chloride, ammonium carbonate, ammonium fluoride, and the like), hydrazine, ethylenediaminetetraacetic acid, nitrilotriacetic acid, uracildiacetic acid, and glycine. The complexing agent may not be contained, and in a case where the complexing agent is contained, the amount of the complexing agent contained in the mixed solution containing the nickel salt solution, the cobalt salt solution, the optional metal M salt solution, and the complexing agent is, for example, more than 0 and 2.0 or less in terms of molar ratio to the sum of the number of moles of the metal salts.

During the precipitation, an alkali metal hydroxide (for example, sodium hydroxide, or potassium hydroxide) is added, if necessary, in order to adjust the pH value of the aqueous solution.

The inside of a reaction tank is preferably an inert atmosphere. In the case of the inert atmosphere, it is possible to suppress aggregation of elements that are more easily oxidized than nickel, and to obtain a uniform composite metal hydroxide.

In a case where manganese is contained as a transition metal, it is preferable that the inside of the reaction tank be an appropriate oxygen-containing atmosphere or in the presence of an oxidizing agent while maintaining an inert atmosphere. This is because the morphology of the metal composite hydroxide can be easily controlled by appropriately oxidizing the transition metal. By controlling the state of the metal composite hydroxide, the element ratio R can be easily adjusted within the range of the present invention. The oxygen and the oxidizing agent in the oxygen-containing gas may have enough oxygen atoms to oxidize the transition metal.

Unless a large amount of oxygen atoms are introduced, the inside of the reaction tank can be maintained in the inert atmosphere.

In order to cause the inside of the reaction tank to be in an oxygen-containing atmosphere, an oxygen-containing gas may be introduced into the reaction tank. In order to improve the uniformity of the solution in the reaction tank, it is more preferable to bubble the oxygen-containing gas. As the oxygen-containing gas, oxygen gas or air, or a mixed gas of oxygen gas or air and an oxygen-free gas such as nitrogen gas can be used. Among these, the mixed gas is preferable from the viewpoint of ease of adjustment of the oxygen concentration in the reaction tank. In addition, in order to promote the crystal growth of the metal composite hydroxide by oxidizing the transition metal element while improving the uniformity in the reaction tank, it is preferable to stir the solution with a stirring blade installed in the reaction tank. By setting the stifling speed to 500 rpm or more and 1500 rpm or less, a metal composite hydroxide having an appropriately grown crystal can be obtained, and the adjustment of the element ratio R within the range of the present invention is facilitated.

In order to cause the inside of the reaction tank to be in the presence of the oxidizing agent, an oxidizing agent may be added to the inside of the reaction tank. As the oxidizing agent, hydrogen peroxide, chlorate, hypochlorite, perchlorate, and permanganate can be used. Hydrogen peroxide is preferably used from the viewpoint of hardly bringing impurities into the reaction system.

When the complexing agent in addition to the nickel salt solution, the cobalt salt solution, the manganese salt solution, and the aluminum salt solution is continuously supplied to the reaction tank, nickel, cobalt, manganese, and aluminum react to manufacture a nickel cobalt manganese aluminum hydroxide. In order to cause requirement (2) and the element ratio R to be within the ranges of the present invention, the temperature of the reaction tank is preferably controlled, for example, in a range of 20° C. or higher and 80° C. or lower, and preferably 30° C. or higher and 70° C. or lower during the reaction. Furthermore, in order to cause requirement (2) and the element ratio R to be within the ranges of the present invention, the pH value in the reaction tank is preferably controlled, for example, in a range of a pH of 9 or more and a pH of 13 or less, and preferably a pH of 11 or more and a pH of 13 or less when the temperature of the solution in the reaction tank is 40° C. Under these conditions, the materials in the reaction tank are appropriately stirred. As the reaction tank, a reaction tank of a type which causes the formed reaction precipitate to overflow for separation can be used.

By appropriately controlling the concentrations of the metal salts supplied to the reaction tank, the stifling speed, the reaction temperature, the reaction pH, calcining conditions, which will be described later, and the like, it is possible to control various physical properties of a lithium-containing transition metal composite oxide which is finally obtained, such as requirements (1) and (2), element ratio R, and BET specific surface area.

Since the reaction conditions depend on the size of the reaction tank used and the like, the reaction conditions may be optimized while monitoring various physical properties of the lithium composite oxide which is finally obtained.

After the above reaction, the obtained reaction precipitate is washed with water and then dried to isolate a nickel cobalt manganese aluminum composite hydroxide as a nickel cobalt manganese aluminum composite compound. In addition, the obtained reaction precipitate may be washed with a weak acid water or an alkaline solution containing sodium hydroxide or potassium hydroxide, as necessary.

In the present embodiment, from the viewpoint of controlling requirement (2), a metal composite compound isolated by washing a coprecipitate slurry with a washing solution containing an alkali and dehydrating the resultant is preferable.

As the washing solution containing an alkali, a sodium hydroxide solution is preferable.

In the above example, the nickel cobalt manganese aluminum composite hydroxide is manufactured, but a nickel cobalt manganese aluminum composite oxide may be prepared. For example, a nickel cobalt manganese aluminum composite oxide can be prepared by calcining the nickel cobalt manganese aluminum composite hydroxide. As the calcining time, the total time until the temperature is reached and the temperature retention is ended after the start of temperature rising is preferably 1 hour or longer and 30 hours or shorter. The temperature rising rate of a heating step in which the highest retention temperature is reached is preferably 180° C./hr or more, more preferably 200° C./hr or more, and particularly preferably 250° C./hr or more.

(Step of Manufacturing Lithium-Containing Transition Metal Composite Oxide)

[Mixing Step]

The metal composite oxide or hydroxide is dried and thereafter mixed with a lithium compound. The drying condition is not particularly limited, and, for example, may be any of a condition under which a metal composite oxide or hydroxide is not oxidized and reduced (specifically, a condition under which oxides or hydroxides are dried), a condition under which a metal composite hydroxide is oxidized (specifically, a drying condition under which a hydroxide is oxidized to an oxide), and a condition under which a metal composite oxide is reduced (specifically, a drying condition under which an oxide is reduced to a hydroxide). For conditions under which no oxidation and reduction occur, an inert gas such as nitrogen, helium, or argon may be used, and for conditions under which a hydroxide is oxidized, oxygen or air may be used. In addition, as a condition under which a metal composite oxide is reduced, a reducing agent such as hydrazine or sodium sulfite may be used in an inert gas atmosphere. As the lithium compound, any one or two or more of lithium carbonate, lithium nitrate, lithium acetate, lithium hydroxide, lithium hydroxide hydrate, lithium oxide can be mixed and used.

After drying the metal composite oxide or hydroxide, classification may be appropriately performed thereon. The lithium compound and metal composite hydroxide mentioned above are used in consideration of the composition ratio of the final object, and the lithium compound and the nickel cobalt manganese aluminum composite hydroxide are mixed in proportions such that the molar ratio (Li/Me) between lithium in the lithium compound and the metal elements in the nickel cobalt manganese aluminum composite hydroxide exceeds 1. That is, the lithium compound and the nickel cobalt manganese aluminum composite hydroxide are mixed in proportions such that the molar ratio between lithium and the sum of the metal elements excluding lithium exceeds 1.

[Calcining Step]

For the calcining, dry air, oxygen atmosphere, inert atmosphere, or the like is used depending on the desired composition, and a plurality of heating steps are performed as necessary.

The calcining temperature of the metal composite oxide or hydroxide and the lithium compound such as lithium hydroxide or lithium carbonate is not particularly limited, but is preferably 600° C. or higher and 1000° C. or lower, more preferably 680° C. or higher and 950° C. or lower, and even more preferably 700° C. or higher and 900° C. or lower.

When the calcining temperature is equal to or higher than the lower limit, a positive electrode active material for a lithium secondary battery having a strong crystal structure can be obtained. When the calcining temperature is equal to or lower than the upper limit, volatilization of lithium on the surface of the secondary particles can be reduced.

The calcining temperature in the present specification means the temperature of the atmosphere in a calcining furnace, and is the highest temperature of the retention temperature in a main calcining step (hereinafter, sometimes referred to as the highest retention temperature). In the case of the main calcining step having a plurality of heating steps, the calcining temperature means the temperature when heating is performed at the highest retention temperature among the heating steps.

The calcining time is preferably 3 hours or longer and 50 hours or shorter. When the calcining time exceeds 50 hours, the battery performance tends to be inferior due to volatilization of lithium. When the calcining time is shorter than 3 hours, the crystals develop poorly, and the battery performance tends to be deteriorated. In addition, it is also effective to perform preliminary calcining before the abovementioned calcining. The preliminary calcining is preferably performed in a temperature range of 300° C. or higher and 850° C. or lower for 1 hour or longer and 10 hours or shorter.

In the present embodiment, the temperature rising rate of the heating step in which the highest retention temperature is reached is preferably 180° C./hr or more, more preferably 200° C./hr or more, and particularly preferably 250° C./hr or more.

The temperature rising rate of the heating step in which the highest retention temperature is reached is calculated from the time from when the temperature rising is started until a retention temperature, which will be described, is reached in a calcining apparatus.

The calcined product contains impurities in addition to the lithium-containing transition metal composite oxide. In the present embodiment, "impurities" include sulfur-containing compounds (residual sulfate radicals) such as $SO_4$ remaining on the surface of the particles of the lithium-containing transition metal composite oxide after the calcining step, residual lithium carbonate, coprecipitation residues of alkali metals used for pH control, and the like.

In a case where a sulfate is used as a transition metal, there are cases where sulfate radicals resulting therefrom remain. In the present embodiment, the source of the residual sulfate radicals as the impurities is not particularly limited. For example, even in a case where a sulfate is not used, sulfur-containing compounds remaining on the surface of the particles due to various materials used and the like are also included in the impurities.

Furthermore, in a case where lithium carbonate is used as a lithium source, lithium carbonate as an impurity includes residual lithium carbonate resulting therefrom. Even in a case where a lithium source other than lithium carbonate is used, lithium carbonate that can be generated by reaction with carbon dioxide in the air is also included in the "impurities".

The lithium-containing transition metal composite oxide obtained by the calcining is appropriately classified after pulverization. The pulverization of the lithium-containing transition metal composite oxide is preferably pulverization with a strength that breaks the aggregation of the secondary particles and does not crush the secondary particles themselves.

[Washing Step]

In the washing step, the washing solution and the calcined product (that is, the calcined lithium-containing transition metal composite oxide) are mixed to form a slurry, and the slurry is stirred for a predetermined time and then filtered to wash the calcined product powder. By performing the washing step, impurities contained in the calcined product obtained in the calcining step can be removed. In this case, from the viewpoint of suppressing excessive elution of lithium from the lithium-containing transition metal composite oxide inside the particles as the calcined product powder, the amount of the washing solution for the calcined product is adjusted to a washing solution amount such that the concentration of lithium carbonate in the washing solution in a case where it is assumed that the total amount of residual lithium carbonate contained in the calcined product before washing is dissolved in the washing solution is $1/10$ or more times the solubility (the solute concentration in the saturated solution) of lithium carbonate in the washing solution at the temperature of the washing solution during the washing step. The washing solution amount is adjusted such that the concentration of lithium carbonate in the washing solution is preferably $1/5$ or more times, more preferably $1/3$ or more times, and even more preferably $1/2$ or more times the solubility of lithium carbonate in the washing solution at the temperature of the washing solution during the washing step. In addition, from the viewpoint of having sufficient handling properties, the washing solution amount is adjusted such that the concentration of lithium carbonate in the washing solution in a case where it is assumed that the total amount of residual lithium carbonate contained in the calcined product before washing is dissolved in the washing solution is 3 or less times the solubility of lithium carbonate in the washing solution at the temperature of the washing solution during the washing step. The washing solution amount is adjusted such that the concentration of lithium carbonate in the washing solution is preferably 2 or less times, and more preferably 1 or less times the solubility of lithium carbonate in the washing solution at the temperature of the washing solution during the washing step.

The upper limit and the lower limit of the washing solution amount can be arbitrarily combined. For example, the washing solution amount is adjusted such that the concentration of lithium carbonate in the washing solution is preferably $1/10$ or more times and 3 or less times, preferably $1/5$ or more times and 2 or less times, more preferably $1/3$ or more times and 1 or less times, and even more preferably $1/2$ or more times and 1 or less times the solubility of lithium carbonate in the washing solution at the temperature of the washing solution during the washing step.

When lithium is excessively eluted from the lithium-containing transition metal composite oxide inside the particles as the calcined product powder by the washing step, Li/Me of the lithium-containing transition metal composite oxide, that is, the molar ratio of lithium (the molar ratio of lithium to the total amount (total molar quantity) of the metal elements excluding lithium) decreases. However, by adjusting the washing solution amount, a decrease in Li/Me can be suppressed.

Examples of the washing solution used in the washing step include water and an alkaline solution. In the present embodiment, water is preferable.

The washing time is not particularly limited, but is preferably 1 minute or longer, and more preferably 5 minutes or longer from the viewpoint of sufficiently removing impurities. In addition, from the viewpoint of enhancing productivity, the washing time is preferably 120 minutes or shorter, and more preferably 60 minutes or shorter.

In the washing step of manufacturing method 1, the temperature of the washing solution used is from −20° C. or higher and 40° C. or lower. From the viewpoint of suppressing excessive elution of lithium from the lithium-containing transition metal composite oxide inside the calcined product powder during the washing, the temperature of the washing solution used is preferably 25° C. or lower, more preferably 15° C. or lower, and particularly preferably lower than 10° C. From the viewpoint of preventing freezing of the washing solution, the temperature of the washing solution used is more preferably −10° C. or higher, even more preferably −5° C. or higher, and particularly preferably 0° C. or higher. The upper limit and the lower limit thereof can be arbitrarily combined. For example, the temperature of the washing solution is preferably −10° C. or higher and 25° C. or lower, more preferably −5° C. or higher and 15° C. or lower, and particularly preferably 0° C. or higher and lower than 10° C. Particularly, by causing the temperature of the washing solution to be 0° C. or higher and lower than 10° C., the impurities of the obtained lithium-containing transition metal composite oxide can be sufficiently removed, excessive elution of lithium from the surface of the secondary particles of the obtained lithium-containing transition metal composite oxide can be suppressed, and the concentration gradient can be controlled to be small so as to satisfy Formula (II). Accordingly, a lithium-containing transition metal composite oxide having a high output at a high voltage and a high current rate can be obtained.

[Drying Step]

In the present embodiment, it is preferable that a drying step be further included after the washing step. That is, it is preferable that the mixing step, the calcining step, the washing step, and the drying step be included in this order. The temperature and method for drying the lithium-containing transition metal composite oxide in the drying step are not particularly limited, but the drying temperature is preferably 30° C. or higher, more preferably 40° C. or higher, and even more preferably 50° C. or higher from the viewpoint of sufficiently removing moisture. In addition, from the viewpoint of preventing the formation of a heterophase on the surface, the drying temperature is preferably lower than 300° C., more preferably 250° C. or lower, and even more preferably 200° C. or lower. The upper limit and the lower limit of the drying temperature can be arbitrarily combined. For example, the drying temperature is preferably 30° C. or higher and lower than 300° C., more preferably 40° C. or higher and 250° C. or lower, and even more preferably 50° C. or higher and 200° C. or lower.

The atmosphere in the drying step includes an oxygen atmosphere, an inert atmosphere, a reduced pressure atmosphere, and a vacuum atmosphere. By performing the heat treatment after the washing in the above atmosphere, the reaction between the lithium-containing transition metal composite oxide and moisture or carbon dioxide in the atmosphere during the heat treatment is suppressed, and a lithium-containing transition metal composite oxide with fewer impurities is obtained.

[Re-Calcining Step]

In the present embodiment, a re-calcining step may be further included after the washing step. That is, the mixing step, the calcining step, the washing step, and the re-calcining step may be included in this order.

The baking temperature in the re-baking step of the lithium-containing transition metal composite oxide is not particularly limited, but is preferably 300° C. or higher, more preferably 350° C. or higher, and even more preferably 400° C. or higher from the viewpoint of preventing a reduction in charge capacity. In addition, although there is no particular limitation, the baking temperature is preferably 1000° C. or lower, and more preferably 950° C. or lower from the viewpoint of preventing volatilization of lithium and obtaining a lithium-containing transition metal composite oxide having a target composition.

The volatilization of lithium can be controlled by the baking temperature.

The upper limit and the lower limit of the baking temperature can be arbitrarily combined. For example, the baking temperature is preferably 1000° C. or lower and 300° C. or higher, more preferably 950° C. or lower and 350° C. or higher, and even more preferably 950° C. or lower and 400° C. or higher.

As the re-calcining time, the total time until the temperature is reached and the temperature retention is ended after the start of temperature rising is preferably 1 hour or longer and 30 hours or shorter. When the total time is 30 hours or shorter, volatilization of lithium can be suppressed, and deterioration of the battery performance can be prevented.

When the total time is 1 hour or longer, the development of crystals proceeds favorably, and the battery performance can be improved.

In addition, it is also effective to perform preliminary calcining before the above-mentioned calcining. The preliminary calcining as described above is preferably performed in a temperature range of 300° C. or higher and 850° C. or lower for 1 hour or longer and 10 hours or shorter.

In the present embodiment, the temperature rising rate of the heating step in which the highest retention temperature is reached is preferably 180° C./hr or more, more preferably 200° C./hr or more, and particularly preferably 250° C./hr or more.

By performing the re-calcining step under the above conditions, impurities can be reduced.

[Method For Manufacturing Positive Electrode Active Material For Lithium Secondary Battery Having Coating Particles or Coating Layer]

In the case of manufacturing a positive electrode active material for a lithium secondary battery having coating particles or a coating layer, a coating raw material and the lithium-containing transition metal composite oxide are first mixed. Thereafter, by performing a heat treatment as necessary, coating particles or a coating layer made of the coating raw material can be formed on the surface of primary particles or secondary particles of the lithium-containing transition metal composite oxide.

As the coating raw material, an oxide, hydroxide, carbonate, nitrate, sulfate, halide, oxalate, or alkoxide of one or more elements selected from the group consisting of aluminum, boron, titanium, zirconium, and tungsten can be used, and an oxide is preferable. As the coating raw material, aluminum oxide, aluminum hydroxide, aluminum sulfate, aluminum chloride, aluminum alkoxide, boron oxide, boric acid, titanium oxide, titanium chloride, titanium alkoxide, zirconium oxide, tungsten oxide, and tungstic acid can be adopted, and aluminum oxide, aluminum hydroxide, boron oxide, boric acid, zirconium oxide, and tungsten oxide are preferable.

The coating raw material is preferably finer than the secondary particle of the lithium-containing transition metal composite oxide. Accordingly, the surface of the lithium-containing transition metal composite oxide can be more efficiently coated with the coating raw material. Specifically, the average secondary particle diameter of the coating raw material is preferably 1 μm or less, and more preferably 0.1 μm or less. The lower limit of the average secondary particle diameter of the coating raw material is preferably as small as possible, and for example, is 0.001 μm. The average secondary particle diameter of the coating raw material can be measured in the same manner as the average secondary particle diameter of the lithium-containing transition metal composite oxide.

The mixing of the coating raw material and the lithium-containing transition metal composite oxide may be performed in the same manner as the mixing during the manufacturing of the positive electrode active material for a lithium secondary battery. A method of mixing using a mixing apparatus that does not include mixing media such as balls and does not involve strong pulverization, such as a method of mixing using a powder mixer equipped with a stirring blade inside, is preferable. Furthermore, the coating layer can be more firmly attached to the surface of the lithium-containing transition metal composite oxide by being held in an atmosphere containing water after mixing.

The heat treatment conditions (temperature, retention time) in the heat treatment performed as necessary after the mixing of the coating raw material and the lithium-containing transition metal composite oxide may vary depending on the kind of the coating raw material. The heat treatment temperature is preferably set to be in a range of 300° C. or higher and 850° C. or lower, but is preferably a temperature equal to or lower than the calcining temperature of the lithium-containing transition metal composite oxide. When the temperature is higher than the calcining temperature of the lithium-containing transition metal composite oxide, there are cases where the coating raw material forms a solid solution with the lithium-containing transition metal composite oxide and the coating layer is not formed. The retention time in the heat treatment is preferably set to be shorter than the retention time at the time of calcining. As an atmosphere in the heat treatment, an atmosphere gas similar to that in the above-described calcining can be adopted.

A positive electrode active material for a lithium secondary battery can be obtained by forming the coating layer on the surface of the lithium-containing transition metal composite oxide using a technique such as sputtering, CVD, or vapor deposition.

Moreover, there are cases where a positive electrode active material for a lithium secondary battery having a coating layer is obtained by mixing and calcining the metal composite oxide or hydroxide, the lithium compound, and the coating raw material.

The positive electrode active material for a lithium secondary battery provided with the coating layer on the surface of the primary particles or secondary particles of the lithium-containing transition metal composite oxide is appropriately crushed and classified to be a positive electrode active material for a lithium secondary battery having a coating layer.

<<Method 2 For Manufacturing Lithium-Containing Transition Metal Composite Oxide>>

A method 2 for manufacturing the lithium-containing transition metal composite oxide of the present invention (hereinafter, referred to as "manufacturing method 2") includes a mixing step of mixing a lithium compound and a metal composite compound containing at least nickel to obtain a mixture, a calcining step of calcining the mixture to obtain a calcined product, and a washing step of washing the calcined product, as essential steps.

In the mixing step, mixing is performed so that the molar ratio (Li/Me) between lithium contained in the lithium compound and metal element in the metal composite compound containing at least nickel exceeds 1.

Manufacturing method 2 of the present invention includes the same steps as those of manufacturing method 1 of the present invention except that the washing step is different. Description regarding (Step of Manufacturing Metal Composite Compound) and (Step of Manufacturing Lithium-Containing Transition Metal Composite Compound) that may be included in manufacturing method 2, and furthermore, [Mixing Step] and [Calcining Step] which are essential steps of manufacturing method 2, [Drying Step] and [Re-calcining Step] of optional steps, and [Positive Electrode Active Material for Lithium Secondary Battery Having Coating Particles or Coating Layer] are the same as those of manufacturing method 1.

Hereinafter, the washing step of manufacturing method 2 will be described.

[Washing Step]

In the washing step, the washing solution and the calcined product (that is, the calcined lithium-containing transition metal composite oxide) are mixed to form a slurry, and the slurry is stirred for a predetermined time and then filtered to wash the calcined product powder. By performing the washing step, impurities contained in the calcined product obtained in the calcining step can be removed. In this case, from the viewpoint of suppressing excessive elution of lithium from the lithium-containing transition metal composite oxide inside the particles as the calcined product powder, the amount of the washing solution for the calcined product is adjusted to a washing solution amount such that the concentration of lithium carbonate in the washing solution in a case where it is assumed that the total amount of residual lithium carbonate contained in the calcined product before washing is dissolved in the washing solution is $1/10$ or more times the solubility of lithium carbonate in the washing solution at the temperature of the washing solution during the washing step. The washing solution amount is adjusted such that the concentration of lithium carbonate in the washing solution is preferably $1/5$ or more times, and more preferably $1/3$ or more times the solubility of lithium carbonate in the washing solution at the temperature of the washing solution. In addition, from the viewpoint of having sufficient handling properties, the washing solution amount is adjusted such that the concentration of lithium carbonate in the washing solution in a case where it is assumed that the total amount of residual lithium carbonate contained in the calcined product before washing is dissolved in the washing solution is 3 or less times the solubility of lithium carbonate in the washing solution at the temperature of the washing solution during the washing step. The washing solution amount is adjusted such that the concentration of lithium carbonate in the washing solution is preferably 2 or less times, and more preferably 1 or less times the solubility of lithium carbonate in the washing solution at the temperature of the washing solution.

The upper limit and the lower limit of the washing solution amount can be arbitrarily combined. For example, the washing solution amount is adjusted such that the concentration of lithium carbonate in the washing solution is preferably $1/10$ or more times and 3 or less times, preferably $1/5$ or more times and 2 or less times, and more preferably $1/3$ or more times and 1 or less times the solubility of lithium carbonate in the washing solution at the temperature of the washing solution during the washing step.

When lithium is excessively eluted from the lithium-containing transition metal composite oxide inside the particles as the baked product powder by the washing step, Li/Me of the lithium-containing transition metal composite oxide, that is, the molar ratio of lithium (the molar ratio of lithium to the total amount of the metal elements excluding lithium) decreases. However, by adjusting the washing solution amount, a decrease in Li/Me can be suppressed.

Examples of the washing solution used in the washing step include water and an alkaline solution. In the present embodiment, water is preferable.

The washing time is not particularly limited, but is preferably 1 minute or longer, and more preferably 5 minutes or longer from the viewpoint of sufficiently removing impurities. In addition, from the viewpoint of enhancing productivity, the washing time is preferably 120 minutes or shorter, and more preferably 60 minutes or shorter.

In manufacturing method 2, in the washing step, the temperature of the slurry containing the calcined product and the washing solution used for washing is maintained at −20° C. or higher and lower than 10° C., and washing is performed in an amount of the washing solution in a case where it is assumed that the total amount of residual lithium carbonate contained in the calcined product before washing is dissolved in the washing solution such that the concentration of lithium carbonate in the washing solution is 1/10 or more times and 3 or less times the solubility of lithium carbonate in the washing solution at the temperature of the slurry.

In the washing step in manufacturing method 2, the temperature of the slurry containing the baked product and the washing solution used for washing is maintained at −20° C. or higher and lower than 10° C. From the viewpoint of suppressing excessive elution of lithium from the lithium-containing transition metal composite oxide inside the particles as the baked product powder during the washing, the temperature of the slurry is more preferably 8° C. or lower, even more preferably 7° C. or lower, and particularly preferably is 6° C. or lower. From the viewpoint of preventing freezing of the washing solution, the temperature of the slurry is preferably −10° C. or higher, more preferably −5° C. or higher, and particularly preferably 0° C. or higher. The upper limit and the lower limit of the temperature of the slurry can be arbitrarily combined.

For example, the temperature of the slurry is preferably −10° C. or higher and 8° C. or lower, more preferably −5° C. or higher and 7° C. or lower, and even more preferably 0° C. or higher and 6° C. or lower.

By causing the temperature of the slurry to be within the above range, the impurities of the obtained lithium-containing transition metal composite oxide can be sufficiently removed, excessive elution of lithium from the surface of the secondary particles of the obtained lithium-containing transition metal composite oxide can be suppressed, and the lithium concentration gradient can be controlled to be small so as to satisfy Formula (II). Accordingly, a lithium-containing transition metal composite oxide for a lithium secondary battery having a high output at a high voltage and a high current rate can be obtained.

In the present specification, maintaining the temperature of the slurry at the above-mentioned temperature means that the temperature reaches a specified temperature before the washing step is ended. For example, after mixing the washing solution and the baked product, the temperature of the slurry may be maintained within the above-mentioned temperature range until 1 minute before the washing step is ended.

<<Method 3 For Manufacturing Lithium-Containing Transition Metal Composite Oxide>>

A method 3 for manufacturing the lithium-containing transition metal composite oxide of the present invention (hereinafter, referred to as "manufacturing method 3") includes a mixing step of mixing a lithium compound and a metal composite compound containing at least nickel to obtain a mixture, a calcining step of calcining the mixture to obtain a calcined product, and a washing step of washing the calcined product, as essential steps.

In the mixing step, mixing is performed so that the molar ratio (Li/Me) between lithium contained in the lithium compound and metal element in the metal composite compound containing at least nickel exceeds 1.

Manufacturing method 3 of the present invention includes the same steps as those of manufacturing method 1 of the present invention except that the washing step is different. Description regarding (Step of Manufacturing Metal Composite Compound) and (Step of Manufacturing Lithium-Containing Transition Metal Composite Compound) that may be included in manufacturing method 3, and furthermore, [Mixing Step] and [Calcining Step] which are essential steps of manufacturing method 3, [Drying Step] and [Re-calcining Step] of optional steps, and [Positive Electrode Active Material for Lithium Secondary Battery Having Coating Particles or Coating Layer] are the same as those of manufacturing method 1.

Hereinafter, the washing step of manufacturing method 3 will be described.

The washing step of manufacturing method 3 satisfies all of the following requirements (A), (B), and (C).

(A) The temperature of the washing solution used for washing is set to −20° C. or higher and 40° C. or lower.

(B) Washing is performed in an amount of the washing solution used for washing such that the concentration of lithium carbonate in the washing solution in a case where it is assumed that the total amount of residual lithium carbonate contained in the calcined product before washing is dissolved in the washing solution is 1/10 or more times and 3 or less times the solubility of lithium carbonate in the washing solution at the temperature of the washing solution during the washing step.

(C) The temperature of the slurry containing the calcined product and the washing solution used for washing is maintained at −20° C. or higher and lower than 10° C.

Description regarding the requirements (A) and (B) in manufacturing method 3 is the same as the description regarding the washing step described in manufacturing method 1. Description regarding requirement (C) in manufacturing method 3 is the same as the description of the washing step described in manufacturing method 2.

In manufacturing method 3, by causing the washing step to satisfy all of the requirements (A) to (C), the impurities of the obtained lithium-containing transition metal composite oxide can be sufficiently removed, excessive elution of lithium from the surface of the secondary particles of the obtained lithium-containing transition metal composite oxide can be suppressed, and the lithium concentration gradient can be controlled to be small so as to satisfy Formula (II). Accordingly, a lithium-containing transition metal composite oxide having a high output at a high voltage and a high current rate can be obtained.

In manufacturing method 3, it is more preferable that the temperature of the washing solution used for the washing of requirement (A) be 0° C. or higher and 20° C. or lower, and the temperature of the slurry of requirement (C) be 0° C. or higher and 10° C. or lower.

There are cases where the lithium-containing transition metal composite oxide according to one embodiment of the present invention is obtained without a washing step. For example, a lithium-containing transition metal composite oxide that satisfies the conditions (1) and (2) is obtained by obtaining a metal composite hydroxide as the metal composite compound described in the manufacturing methods 1 to 3, thereafter calcining the metal composite hydroxide under the condition of 700° C. or higher and 900° C. or lower, and 1 hour or longer and 30 hours or shorter to obtain a metal composite oxide, mixing the metal composite oxide with a lithium compound, and calcining the mixture under the condition of 700° C. or higher and 900° C. or lower, and 3 hours or longer and 50 hours or shorter.

<Lithium Secondary Battery>

Next, a positive electrode using the lithium-containing transition metal composite oxide of the present embodiment as a positive electrode active material of a lithium secondary battery, and a lithium secondary battery having the positive electrode will be described while describing the configuration of a lithium secondary battery.

An example of the lithium secondary battery of the present embodiment includes a positive electrode, a negative electrode, a separator interposed between the positive electrode and the negative electrode, and an electrolytic solution disposed between the positive electrode and the negative electrode.

Figure 1B:
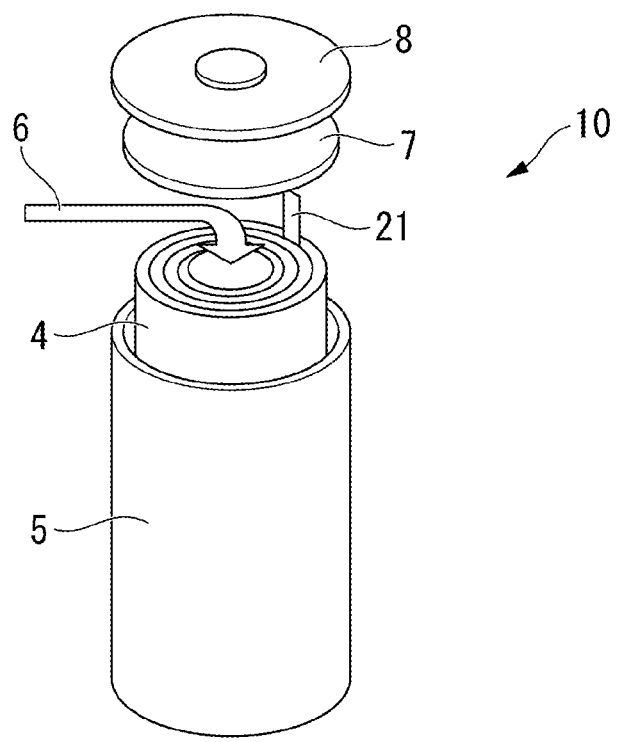
FIG. 1B is a schematic configuration view illustrating an example of the lithium-ion secondary battery.

FIGS. 1A and 1B are schematic views illustrating an example of the lithium secondary battery of the present embodiment. A cylindrical lithium secondary battery 10 of the present embodiment is manufactured as follows.

First, as illustrated in FIG. 1A, a pair of separators 1 having a strip shape, a strip-shaped positive electrode 2 having a positive electrode lead 21 at one end, and a strip-like negative electrode 3 having a negative electrode lead 31 at one end are stacked in order of the separator 1, the positive electrode 2, the separator 1, and the negative electrode 3 and are wound to form an electrode group 4.

Next, as shown in FIG. 1B, the electrode group 4 and an insulator (not illustrated) are accommodated in a battery can 5, the can bottom is then sealed, the electrode group 4 is impregnated with an electrolytic solution 6, and an electrolyte is disposed between the positive electrode 2 and the negative electrode 3. Furthermore, the upper portion of the battery can 5 is sealed with a top insulator 7 and a sealing body 8, whereby the lithium secondary battery 10 can be manufactured.

The shape of the electrode group 4 is, for example, a columnar shape such that the cross-sectional shape when the electrode group 4 is cut in a direction perpendicular to the winding axis is a circle, an ellipse, a rectangle, or a rectangle with rounded corners.

In addition, as a shape of the lithium secondary battery having the electrode group 4, a shape defined by IEC60086 which is a standard for a battery defined by the International Electrotechnical Commission (IEC), or by JIS C 8500 can be adopted. For example, shapes such as a cylindrical shape and a square shape can be adopted.

Furthermore, the lithium secondary battery is not limited to the wound type configuration, and may have a stacked type configuration in which a stacked structure of a positive electrode, a separator, a negative electrode, and a separator is repeatedly stacked. The stacked type lithium secondary battery can be exemplified by a so-called coin type battery, a button type battery, and a paper type (or sheet type) battery.

Hereinafter, each configuration will be described in order.

(Positive Electrode)

The positive electrode of the present embodiment can be manufactured by first preparing a positive electrode mixture containing a positive electrode active material, a conductive material, and a binder, and causing a positive electrode current collector to hold the positive electrode mixture.

(Conductive Material)

A carbon material can be used as the conductive material included in the positive electrode of the present embodiment. As the carbon material, there are graphite powder, carbon black (for example, acetylene black), a fibrous carbon material, and the like. Since carbon black is fine particles and has a large surface area, the addition of a small amount of carbon black to the positive electrode mixture increases the conductivity inside the positive electrode and thus improve the charge and discharge efficiency and output characteristics. However, when the carbon black is added too much, both the binding force between the positive electrode mixture and the positive electrode current collector and the binding force inside the positive electrode mixture by the binder decrease, which causes an increase in internal resistance.

The proportion of the conductive material in the positive electrode mixture is preferably 5 parts by mass or more and 20 parts by mass or less with respect to 100 parts by mass of the positive electrode active material. In a case of using a fibrous carbon material such as graphitized carbon fiber or carbon nanotube as the conductive material, the proportion can be reduced. The ratio of the positive electrode active material to the total mass of the positive electrode mixture is preferably 80 to 98 mass %.

(Binder)

A thermoplastic resin can be used as the binder included in the positive electrode of the present embodiment.

As the thermoplastic resin, fluorine resins such as polyvinylidene fluoride (hereinafter, sometimes referred to as PVDF), polytetrafluoroethylene (hereinafter, sometimes referred to as PTFE), tetrafluoroethylene-hexafluoropropylene-vinylidene fluoride copolymers, hexafluoropropylene-vinylidene fluoride copolymers, and tetrafluoroethylene-perfluorovinyl ether copolymers; and polyolefin resins such as polyethylene and polypropylene can be adopted.

These thermoplastic resins may be used as a mixture of two or more. By using a fluorine resin and a polyolefin resin as the binder and setting the ratio of the fluorine resin to the entire positive electrode mixture to 1 mass % or more and 10 mass % or less and the ratio of the fluorine resin to 0.1 mass % or more and 2 mass % or less, a positive electrode mixture having both high adhesion to the positive electrode current collector and high bonding strength in the positive electrode mixture can be obtained.

(Positive Electrode Current Collector)

As the positive electrode current collector included in the positive electrode of the present embodiment, a strip-shaped member formed of a metal material such as Al, Ni, or stainless steel as the forming material can be used. Among these, from the viewpoint of easy processing and low cost, it is preferable to use Al as the forming material and process Al into a thin film.

As a method of causing the positive electrode current collector to hold the positive electrode mixture, a method of press-forming the positive electrode mixture on the positive electrode current collector can be adopted. In addition, the positive electrode mixture may be held by the positive electrode current collector by forming the positive electrode mixture into a paste using an organic solvent, applying the paste of the positive electrode mixture to at least one side of the positive electrode current collector, drying the paste, and pressing the paste to be fixed.

In a case of forming the positive electrode mixture into a paste, as the organic solvent which can be used, amine solvents such as N,N-dimethylaminopropylamine and diethylenetriamine; ether solvents such as tetrahydrofuran; ketone solvents such as methyl ethyl ketone; ester solvents such as methyl acetate; and amide solvents such as dimethylacetamide and N-methyl-2-pyrrolidone (hereinafter, sometimes referred to as NMP) can be adopted.

Examples of a method of applying the paste of the positive electrode mixture to the positive electrode current collector include a slit die coating method, a screen coating method, a curtain coating method, a knife coating method, a gravure coating method, and an electrostatic spraying method.

The positive electrode can be manufactured by the method mentioned above.

(Negative Electrode)

The negative electrode included in the lithium secondary battery of the present embodiment may be capable of being doped with or dedoped from lithium ions at a potential lower than that of the positive electrode, and an electrode in which a negative electrode mixture containing a negative electrode active material is held by a negative electrode current collector, and an electrode formed of a negative electrode active material alone can be adopted.

(Negative Electrode Active Material)

As the negative electrode active material included in the negative electrode, materials that can be doped with or dedoped from lithium ions at a potential lower than that of the positive electrode, such as carbon materials, chalcogen compounds (oxides, sulfides, and the like), nitrides, metals, and alloys can be adopted.

As the carbon materials that can be used as the negative electrode active material, graphite such as natural graphite and artificial graphite, cokes, carbon black, pyrolytic carbons, carbon fibers, and an organic polymer compound calcined body can be adopted.

As the oxides that can be used as the negative electrode active material, oxides of silicon represented by the formula $SiO_x$ (where, x is a positive real number) such as $SiO_2$ and $SiO$; oxides of titanium represented by the formula $TiO_x$ (where x is a positive real number) such as $TiO_2$ and $TiO$; oxides of vanadium represented by the formula $VO_x$ (where x is a positive real number) such as $V_2O_5$ and $VO_2$; oxides of iron represented by the formula $FeO_x$ (where x is a positive real number) such as $Fe_3O_4$, $Fe_2O_3$, and $FeO$; oxides of tin represented by the formula $SnO_x$ (where x is a positive real number) such as $SnO_2$ and $SnO$; oxides of tungsten represented by a general formula $WO_x$ (where, x is a positive real number) such as $WO_3$ and $WO_2$; and composite metal oxides containing lithium and titanium or vanadium such as $Li_4Ti_5O_{12}$ and $LiVO_2$ can be adopted.

As the sulfides that can be used as the negative electrode active material, sulfides of titanium represented by the formula $TiS_x$ (where, x is a positive real number) such as $Ti_2S_3$, $TiS_2$, and $TiS$; sulfides of vanadium represented by the formula $VS_x$ (where x is a positive real number) such $V_3S_4$, $VS_2$, and $VS$; sulfides of iron represented by the formula $FeS_x$ (where x is a positive real number) such as $Fe_3S_4$, $FeS_2$, and $FeS$; sulfides of molybdenum represented by the formula $MoS_x$ (where x is a positive real number) such as $Mo_2S_3$ and $MoS_2$; sulfides of tin represented by the formula $SnS_x$ (where x is a positive real number) such as $SnS_2$ and $SnS$; sulfides of tungsten represented by $WS_x$ (where x is a positive real number) such as $WS_2$; sulfides of antimony represented by the formula $SbS_x$ (where x is a positive real number) such as $Sb_2S_3$; and sulfides of selenium represented by the formula $SeS_x$ (where x is a positive real number) such as $Se_5S_3$, $SeS_2$, and $SeS$ can be adopted.

As the nitrides that can be used as the negative electrode active material, lithium-containing nitrides such as $Li_3N$ and $Li_{3-x}A_xN$ (where A is either one or both of Ni and Co, and $0<x<3$ is satisfied) can be adopted.

These carbon materials, oxides, sulfides, and nitrides may be used singly or in combination of two or more. In addition, these carbon materials, oxides, sulfides, and nitrides may be either crystalline or amorphous.

Moreover, as the metals that can be used as the negative electrode active material, lithium metal, silicon metal, tin metal, and the like can be adopted.

As the alloys that can be used as the negative electrode active material, lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$ can be adopted.

These metals and alloys are mainly used alone as an electrode after being processed into, for example, a foil shape.

Among the above-mentioned negative electrode active materials, the carbon material mainly including graphite such as natural graphite and artificial graphite is preferably used because the potential of the negative electrode hardly changes from the uncharged state to the fully charged state during charging (the potential flatness is good), the average discharge potential is low, and the capacity retention ratio during repeated charging and discharging is high (the cycle characteristics are good). The shape of the carbon material may be, for example, a flaky shape such as natural graphite, a spherical shape such as mesocarbon microbeads, a fibrous shape such as graphitized carbon fiber, or an aggregate of fine powder.

The negative electrode mixture described above may contain a binder as necessary. As the binder, a thermoplastic resin can be adopted, and specifically, PVDF, thermoplastic polyimide, carboxymethylcellulose, polyethylene, and polypropylene can be adopted.

(Negative Electrode Current Collector)

As the negative electrode current collector included in the negative electrode, a long sheet-shaped member formed of a metal material, such as Cu, Ni, and stainless steel, as the forming material can be adopted. Among these, it is preferable to use Cu as the forming material and process Cu into a thin film because Cu is less likely to form an alloy with lithium and can be easily processed.

As a method of causing the negative electrode current collector to hold the negative electrode mixture, similarly to the case of the positive electrode, a method using press-forming, or a method of forming the negative electrode mixture into a paste using a solvent or the like, applying the paste onto the negative electrode current collector, drying the paste, and pressing the paste to be compressed can be adopted.

(Separator)

As the separator included in the lithium secondary battery of the present embodiment, for example, a material having a form such as a porous film, non-woven fabric, or woven fabric made of a material such as a polyolefin resin such as polyethylene and polypropylene, a fluorine resin, and a nitrogen-containing aromatic polymer can be used. In addition, two or more of these materials may be used to form the separator, or these materials may be stacked to form the separator.

In the present embodiment, the air resistance of the separator according to the Gurley method defined by JIS P 8117 is preferably 50 sec/100 cc or more and 300 sec/100 cc or less, and more preferably 50 sec/100 cc or more and 200 sec/100 cc or less in order for the electrolyte to favorably permeate therethrough during battery use (during charging and discharging).

In addition, the porosity of the separator is preferably 30 vol % or more and 80 vol % or less, and more preferably 40 vol % or more and 70 vol % or less. The separator may be a laminate of separators having different porosity.

(Electrolytic Solution)

The electrolytic solution included in the lithium secondary battery of the present embodiment contains an electrolyte and an organic solvent.

As the electrolyte contained in the electrolytic solution, lithium compounds such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (here, BOB refers to bis(oxalato)borate), LiFSI (here, FSI refers to bis(fluorosulfonyl)imide), lower aliphatic carboxylic acid lithium compounds, and $LiAlCl_4$ can be adopted, and a mixture of two or more of these may be used. Among these, as the electrolyte, it is preferable to use at least one selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$, which contain fluorine.

As the organic solvent included in the electrolytic solution, for example, carbonates such as propylene carbonate, ethylene carbonate, dimethyl carbonate, diethyl carbonate, ethyl methyl carbonate, 4-trifluoromethyl-1,3-dioxolan-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and g-butyrolactone; nitriles such as acetonitrile and butyronitrile; amides such as N,N-dimethylformamide and N,N-dimethylacetamide; carbamates such as 3-methyl-2-oxazolidone; and sulfur-containing compounds such as sulfolane, dimethyl sulfoxide, and 1,3-propanesultone, or those obtained by introducing a fluoro group into these organic solvents (those in which one or more of the hydrogen atoms of the organic solvent are substituted with a fluorine atom) can be used.

As the organic solvent, it is preferable to use a mixture of two or more thereof. Among these, a mixed solvent containing a carbonate is preferable, and a mixed solvent of a cyclic carbonate and a non-cyclic carbonate and a mixed solvent of a cyclic carbonate and an ether are more preferable. As the mixed solvent of a cyclic carbonate and a non-cyclic carbonate, a mixed solvent containing ethylene carbonate, dimethyl carbonate, and ethyl methyl carbonate is preferable. An electrolytic solution using such a mixed solvent has many features such as a wide operating temperature range, being less likely to deteriorate even when charged and discharged at a high current rate, being less likely to deteriorate even during a long-term use, and being non-degradable even in a case where a graphite material such as natural graphite or artificial graphite is used as the negative electrode active material.

Furthermore, as the electrolytic solution, it is preferable to use an electrolytic solution containing a lithium compound containing fluorine such as $LiPF_6$ and an organic solvent having a fluorine substituent in order to enhance the safety of the obtained lithium secondary battery. A mixed solvent containing ethers having a fluorine substituent, such as pentafluoropropyl methyl ether and 2,2,3,3-tetrafluoropropyl difluoromethyl ether and dimethyl carbonate is even more preferable because the capacity retention ratio is high even when charging or discharging is performed at a high current rate.

A solid electrolyte may be used instead of the electrolytic solution. As the solid electrolyte, for example, an organic polymer electrolyte such as a polyethylene oxide-based polymer compound, or a polymer compound containing at least one or more of a polyorganosiloxane chain or a polyoxyalkylene chain can be used. A so-called gel type in which a non-aqueous electrolyte is held in a polymer compound can also be used. Inorganic solid electrolytes containing sulfides such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$ can be adopted, and a mixture or two or more thereof may be used. By using these solid electrolytes, the safety of the lithium secondary battery may be further enhanced.

In addition, in a case of using a solid electrolyte in the lithium secondary battery of the present embodiment, there may be cases where the solid electrolyte plays a role of the separator, and in such a case, the separator may not be required.

Since the positive electrode active material having the above-described configuration uses the lithium-containing transition metal composite oxide of the present embodiment described above, in the lithium secondary battery using the positive electrode active material, side reactions that occur inside the battery can be suppressed.

Moreover, since the positive electrode having the above-described configuration has the positive electrode active material for a lithium secondary battery of the present embodiment described above, in the lithium secondary battery, side reactions that occur inside the battery can be suppressed.

Furthermore, since the lithium secondary battery having the above-described configuration has the positive electrode described above, a lithium secondary battery in which side reactions occurring inside the battery is suppressed compared to the related art can be achieved.

Another aspect of the present invention is as follows.

[1] A lithium-containing transition metal composite oxide including: secondary particles that are aggregates of primary particles into or from which lithium ions are dopable or dedopable, in which the lithium-containing transition metal composite oxide satisfies the following conditions, (1) the lithium-containing transition metal composite oxide is represented by Formula (I), $$Li[Li_x(Ni_{(1-y-z-w)}Co_yMn_zM_w)_{1-x}]O_2 \qquad (I)$$

(in Formula (I), $0<x\leq 0.2$, $0<y\leq 0.5$, $0\leq z\leq 0.8$, $0\leq w\leq 0.1$, and $y+z+w<1$ are satisfied, and M represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn), (2) when an area value of a peak appearing at 53.8 eV in a lithium 1s spectrum is referred to as α and an area value of a peak appearing at 529.0 eV in an oxygen 1s spectrum is referred to as β when X-ray photoelectron spectroscopy is performed, and a ratio between α and β is referred to as γ (α/β=γ), γ is calculated for each of a surface of the secondary particle and an inside of the secondary particle, and when a γ value of the surface of the secondary particle is referred to as γ1 and a γ value of the inside of the secondary particle is referred to as β2, γ1 and γ2 satisfy a condition of Formula (II).

$$0.3 \leq \gamma1/\gamma2 \leq 1.0 \tag{II}$$

[2] In the lithium-containing transition metal composite oxide according to [1], in which an element ratio R (Li (Atom %)/O (Atom %)) calculated from the peak appearing at 53.8 eV in the lithium 1s spectrum and the peak appearing at 529.0 eV in the oxygen 1s spectrum when the X-ray photoelectron spectroscopy is performed is $0.45 \leq R \leq 0.75$ in the inside of the secondary particle.

[3] The BET specific surface area (m$^2$/g) of the lithium-containing transition metal composite oxide according to [1] or [2] is 0.15 or more and 2.5 or less.

[4] The BET specific surface area (m$^2$/g) of the lithium-containing transition metal composite oxide according to [1] or [2] is 0.15 or more and 1.5 or less.

[5] In a powder X-ray diffraction measurement of the lithium-containing transition metal composite oxide according to any one of [1] to [4] using CuKα radiation, a crystallite size $L_{003}$ at a peak within a range of $2\theta=18.7\pm1°$ is 700 Å or more and 1200 Å or less.

[6] The 50% cumulative volume particle size $D_{50}$ (μm) of the lithium-containing transition metal composite oxide according to any one of [1] to [5] is 3 or more and 15 or less, and a difference between a maximum particle diameter $D_{max}$ and a minimum particle size $D_{min}$ (μm) is $D_{50} \times 2/3$ or more.

[7] The 50% cumulative volume particle size $D_{50}$ (μm) of the lithium-containing transition metal composite oxide according to any one of [1] to [5] is 10 or more and 15 or less, and the difference between the maximum particle diameter $D_{max}$ and the minimum particle size $D_{min}$ (μm) may be $D_{50} \times 2/3$ or more.

[8] A positive electrode for a lithium secondary battery in which a mass ratio between a positive electrode active material for a lithium secondary battery including the lithium-containing transition metal composite oxide according to any one of [1] to [7], acetylene black, and PVDF is the positive electrode active material for a lithium secondary battery:acetylene black:PVDF=92:5:3 and an electrode area is 1.65 cm$^2$ is formed, a coin type battery R2032 is produced including the positive electrode for a secondary battery, a separator in which a heat-resistant porous layer is laminated on a polyethylene porous film, an electrolytic solution obtained by dissolving LiPF$_6$ in a mixed solution of ethylene carbonate, dimethyl carbonate, and ethyl methyl carbonate in a ratio of 30:35:35 (volume ratio) to achieve 1.0 mol/l, and a metal lithium negative electrode for a secondary battery, and when a discharge rate test was performed as follows on the coin type battery R2032 under the following charge/discharge test conditions, the obtained discharge rate characteristics were 27% to 98%.

[Discharge Rate Characteristics]

The discharge rate characteristics (%) as an index of rate performance were calculated by measuring and calculating a 1.0C discharge capacity and a 5.0C discharge capacity and dividing the 5.0C discharge capacity obtained by the measurement by the 1.0C capacity also obtained by the measurement.

[9] A method for manufacturing a lithium-containing transition metal composite oxide including secondary particles that are aggregates of primary particles into or from which lithium ions are dopable or dedopable and represented by General Formula (I), the method including: a mixing step of mixing a lithium compound and a metal composite compound containing at least nickel to obtain a mixture; a calcining step of calcining the mixture to obtain a calcined product; and a washing step of washing the calcined product, in which, in the mixing step, mixing is performed so that a molar ratio (Li/Me, a molar ratio of lithium to a total amount of metal elements excluding lithium) between lithium contained in the lithium compound and metal elements in the metal composite compound containing at least nickel exceeds 1, and in the washing step, a temperature of a washing solution used for washing is set to 0° C. or higher and 10° C. or lower, washing is performed in an amount of the washing solution used for washing such that a concentration of lithium carbonate in the washing solution in a case where it is assumed that a total amount of residual lithium carbonate contained in the calcined product before washing is dissolved in the washing solution is 1/10 or more and 3 or less times a solubility of lithium carbonate in the washing solution at the temperature of the washing solution during the washing step, and a temperature of a slurry containing the calcined product and the washing solution used for washing is maintained at −20° C. or higher and lower than 10° C.

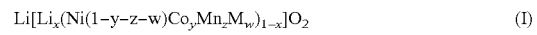

$$Li[Li_x(Ni_{(1-y-z-w)}Co_yMn_zM_w)_{1-x}]O_2 \tag{I}$$

(in Formula (I), $0 \leq x \leq 0.2$, $0 < y \leq 0.5$, $0 \leq z \leq 0.8$, $0 \leq w \leq 0.1$, and $y+z+w<1$ are satisfied, and M represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn)

[10] A method for manufacturing a lithium-containing transition metal composite oxide including secondary particles that are aggregates of primary particles into or from which lithium ions are dopable or dedopable and represented by General Formula (I), the method including: a mixing step of mixing a lithium compound and a metal composite compound containing at least nickel to obtain a mixture; a calcining step of calcining the mixture to obtain a calcined product; a washing step of washing the calcined product; and a re-calcining step of re-calcining the washed calcined product, in which, in the mixing step, mixing is performed so that a molar ratio (Li/Me, a molar ratio of lithium to a total amount of metal elements excluding lithium) between lithium contained in the lithium compound and metal elements in the metal composite compound containing at least nickel exceeds 1, and in the washing step, a temperature of a washing solution used for washing is set to −20° C. or higher and 40° C. or lower, and washing is performed in an amount of the washing solution used for washing such that a concentration of lithium carbonate in the washing solution in a case where it is assumed that a total amount of residual lithium carbonate contained in the calcined product before washing is dissolved in the washing solution is 1/5 or more and 3 or less times a solubility of lithium carbonate in the washing solution at the temperature of the washing solution in the washing step.

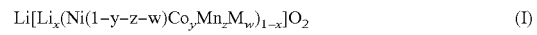

$$Li[Li_x(Ni_{(1-y-z-w)}Co_yMn_zM_w)_{1-x}]O_2 \tag{I}$$

(in Formula (I), $0 \leq x \leq 0.2$, $0 < y \leq 0.5$, $0 \leq z \leq 0.8$, $0 \leq w \leq 0.1$, and $y+z+w<1$ are satisfied, and M represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.)

Another aspect of the present invention is as follows.

[1] A lithium-containing transition metal composite oxide including: secondary particles that are aggregates of primary particles into or from which lithium ions are dopable or dedopable, in which the lithium-containing transition metal composite oxide satisfies the following conditions, (1) the lithium-containing transition metal composite oxide is represented by Formula (I), $$Li[Li_x(Ni_{(1-y-z-w)}Co_yMn_zM_w)_{1-x}]O_2 \quad (I)$$

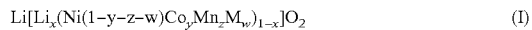

(in Formula (I), $0<x\leq0.2$, $0<y\leq0.5$, $0\leq z\leq0.8$, $0\leq w\leq0.1$, and $y+z+w<1$ are satisfied, and M represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn), (2) when an area value of a peak appearing at 53.8 eV in a lithium 1s spectrum is referred to as α and an area value of a peak appearing at 529.0 eV in an oxygen 1s spectrum is referred to as β when X-ray photoelectron spectroscopy is performed, and a ratio between α and β is referred to as γ (α/β=γ), γ is calculated for each of a surface of the secondary particle and an inside of the secondary particle, and when a γ value of the surface of the secondary particle is referred to as γ1 and a γ value of the inside of the secondary particle is referred to as β2, γ1 and γ2 satisfy a condition of Formula (II).

$$0.3\leq\gamma1/\gamma2\leq1.0 \quad (II)$$

[2] The lithium-containing transition metal composite oxide according to [1], in which an element ratio R (Li (Atom %)/O (Atom %)) calculated from the peak appearing at 53.8 eV in the lithium 1s spectrum and the peak appearing at 529.0 eV in the oxygen 1s spectrum when the X-ray photoelectron spectroscopy is performed is $0.4\leq R\leq0.8$ in the inside of the secondary particle.

[3] The lithium-containing transition metal composite oxide according to [1] or [2], in which a BET specific surface area (m²/g) is 0.1 or more and 3.0 or less.

[4] The lithium-containing transition metal composite oxide according to any one of [1] to [3], in which a crystallite size $L_{003}$ at a peak within a range of $2\theta=18.7\pm1°$ in a powder X-ray diffraction measurement using CuKα radiation is 400 Å or more and 1300 Å or less.

[5] The lithium-containing transition metal composite oxide according to any one of [1] to [4], in which a 50% cumulative volume particle size $D_{50}$ (μm) is 3 or more and 20 or less, and a difference between a maximum particle diameter $D_{max}$ and a minimum particle size $D_{min}$ (μm) is $D_{50}\times2/3$ or more.

[6] A positive electrode active material for a lithium secondary battery, including: the lithium-containing transition metal composite oxide according to any one of [1] to [5].

[7] A positive electrode for a lithium secondary battery, including: the positive electrode active material for a lithium secondary battery according to [6].

[8] A lithium secondary battery including: the positive electrode for a lithium secondary battery according to [7].

[9] A method for manufacturing a lithium-containing transition metal composite oxide including secondary particles that are aggregates of primary particles into or from which lithium ions are dopable or dedopable and represented by General Formula (I), the method including: a mixing step of mixing a lithium compound and a metal composite compound containing at least nickel to obtain a mixture; a calcining step of calcining the mixture to obtain a calcined product; and a washing step of washing the calcined product, in which, in the mixing step, mixing is performed so that a molar ratio (Li/Me, a molar ratio of lithium to a total amount of metal elements excluding lithium) between lithium contained in the lithium compound and metal elements in the metal composite compound containing at least nickel exceeds 1, and in the washing step, a temperature of a washing solution used for washing is set to −20° C. or higher and 40° C. or lower, and washing is performed in an amount of the washing solution used for washing such that a concentration of lithium carbonate in a case where it is assumed that a total amount of residual lithium carbonate contained in the calcined product before washing is dissolved in the washing solution is 1/10 or more and 3 or less times a solubility of lithium carbonate in the washing solution at the temperature of the washing solution during the washing step.

$$Li[Li_x(Ni_{(1-y-z-w)}Co_yMn_zM_w)_{1-x}]O_2 \quad (I)$$

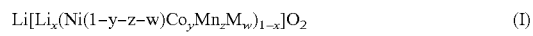

(in Formula (I), $0<x\leq0.2$, $0<y\leq0.5$, $0\leq z\leq0.8$, $0\leq w\leq0.1$, and $y+z+w<1$ are satisfied, and M represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.)

[10] A method for manufacturing a lithium-containing transition metal composite oxide including secondary particles that are aggregates of primary particles into or from which lithium ions are dopable or dedopable and represented by General Formula (I), the method including: a mixing step of mixing a lithium compound and a metal composite compound containing at least nickel to obtain a mixture; a calcining step of calcining the mixture to obtain a calcined product; and a washing step of washing the calcined product, in which, in the mixing step, mixing is performed so that a molar ratio (Li/Me, a molar ratio of lithium to a total amount of metal elements excluding lithium) between lithium contained in the lithium compound and metal elements in the metal composite compound containing at least nickel exceeds 1, and in the washing step, a temperature of a slurry containing the calcined product and a washing solution used for washing is maintained at −20° C. or higher and lower than 10° C. or lower, and washing is performed in an amount of the washing solution used for washing such that a concentration of lithium carbonate in the washing solution in a case where it is assumed that a total amount of residual lithium carbonate contained in the calcined product before washing is dissolved in the washing solution is 1/10 or more and 3 or less times a saturated solubility of lithium carbonate at the temperature of the washing solution during the washing step.

$$Li[Li_x(Ni_{(1-y-z-w)}Co_yMn_zM_w)_{1-x}]O_2 \quad (I)$$

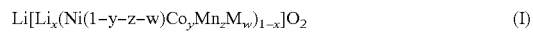

(in Formula (I), $0<x\leq0.2$, $0<y\leq0.5$, $0\leq z\leq0.8$, $0\leq w\leq0.1$, and $y+z+w<1$ are satisfied, and M represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.)

[11] A method for manufacturing a lithium-containing transition metal composite oxide including secondary particles that are aggregates of primary particles into or from which lithium ions are dopable or dedopable and represented by General Formula (I), the method including: a mixing step of mixing a lithium compound and a metal composite

compound containing at least nickel to obtain a mixture; a calcining step of calcining the mixture to obtain a calcined product; and a washing step of washing the calcined product, in which, in the mixing step, mixing is performed so that a molar ratio (Li/Me) between lithium contained in the lithium compound and metal elements in the metal composite compound containing at least nickel exceeds 1, and in the washing step, a temperature of a washing solution used for washing is set to −20° C. or higher and 40° C. or lower, washing is performed in an amount of the washing solution used for washing such that a concentration of lithium carbonate in the washing solution in a case where it is assumed that a total amount of residual lithium carbonate contained in the calcined product before washing is dissolved in the washing solution is 1/10 or more and 3 or less times a solubility of lithium carbonate in the washing solution at the temperature of the washing solution during the washing step, and a temperature of a slurry containing the calcined product and the washing solution used for washing is maintained at −20° C. or higher and lower than 10° C.

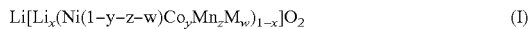
(I)

(in Formula (I), 0<x≤0.2, 0<y≤0.5, 0≤z≤0.8, 0≤w≤0.1, and y+z+w<1 are satisfied, and M represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn.)

EXAMPLES

Next, the present invention will be described in more detail with reference to examples.

In this example, the evaluation of a lithium-containing transition metal composite oxide and a positive electrode active material for a lithium secondary battery, and the preparation and evaluation of a positive electrode and a lithium secondary battery were performed as follows.

<Compositional Analysis of Lithium-containing Transition Metal Composite Oxide>

The compositional analysis of a lithium-containing transition metal composite oxide manufactured by the method described below was performed by using an inductively coupled plasma emission analyzer (SPS 3000, manufactured by SII Nano Technology Inc.) after dissolving the powder of the obtained lithium-containing transition metal composite oxide in hydrochloric acid.

<<X-Ray Photoelectron Spectroscopy (XPS)>>
Measurement of γ1/γ2

A lithium-containing transition metal composite oxide manufactured by the method described below was analyzed by XPS (Quantera SXM, manufactured by ULVAC-PHI, Inc.).

Specifically, first, the obtained lithium-containing transition metal composite oxide was provided in a dedicated substrate. Next, using AlKα radiation, measurement was performed by charge neutralization by electrons and Ar ions with a photoelectron extraction angle of 45 degrees and an aperture diameter of 100 μm, whereby data was obtained.

Then, using the XPS data analysis software MuitiPak, charge correction was performed with the peak attributed to surface contamination hydrocarbons in a carbon 1s spectrum at 284.6 eV, and waveform separation by peak fitting was performed on a peak in a lithium 1s spectrum and a peak in an oxygen 1s spectrum.

A peak area value α appearing at 53.8 eV in the lithium 1s spectrum and a peak area value β appearing at 529.0 eV in the oxygen 1s spectrum were calculated.

Thereafter, the ratio γ (α/β) between α and β was calculated. Here, γ was calculated for the surface of secondary particles and the inside of the secondary particles, and the γ value of the surface of the secondary particles was referred to as γ1 while the γ value of the inside of the secondary particles was referred to as γ2.

In order to calculate γ1, for the XPS measurement of the surface of the secondary particles, using the lithium-containing transition metal composite oxide manufactured by the method described below was provided as it is.

In order to calculate β2, for the XPS measurement of the inside of the secondary particles, Ar ions sputtering was performed on the secondary particles in an XPS apparatus under the same conditions as in the case of a SiO$_2$ film, which was sputtered to a depth of 10 nm. Thereafter, XPS measurement was performed on the exposed region.

At the same point, Ar ion sputtering was performed again under the same conditions as in the case of the SiO$_2$ film sputtered to a depth of 10 nm. Thereafter, XPS measurement was performed again at the same point. This operation was repeated, and the value when no change appeared in the γ value was used as γ2.

Measurement of Element Ratio R (Li (Atom %)/O (Atom %))

The lithium-containing transition metal composite oxide manufactured by the method described below was analyzed by XPS under the same conditions as described above. In the region where γ2 was calculated, the element ratio R (Li (Atom %)/O (Atom %)) was calculated from the area value of the peak appearing at 53.8 eV in the lithium 1s spectrum and the area value of the peak appearing at 529.0 eV in the oxygen 1s spectrum.

<<Measurement of BET Specific Surface Area of Lithium-Containing Transition Metal Composite Oxide>>

After 1 g of the powder of the lithium-containing transition metal composite oxide to be measured was dried in a nitrogen atmosphere at 150° C. for 15 minutes, the powder was measured using Flowsorb II 2300 manufactured by Micromeritics Instrument Corp.

<<Measurement of Crystallite Size of Lithium-Containing Transition Metal Composite Oxide>>

Powder X-ray diffraction measurement of the lithium-containing transition metal composite oxide was performed using an X-ray diffractometer (X'Prt PRO manufactured by Malvern Panalytical Ltd). The obtained lithium-containing transition metal composite oxide was provided in a dedicated substrate, and measurement was performed using a CuKα radiation source at a diffraction angle in a range of 2θ=10° to 90° to obtain a powder X-ray diffraction pattern. Using powder X-ray diffraction pattern comprehensive analysis software JADE 5, the half-width of a peak corresponding to the peak A was obtained from the powder X-ray diffraction pattern, and the crystallite size $L_{003}$ was calculated by the Scherrer equation.

<<Measurement of 50% Cumulative Volume Particle Size $D_{50}$ of Lithium-Containing Transition Metal Composite Oxide>>

0.1 g of the powder of the lithium-containing transition metal composite oxide to be measured was poured into 50 ml of 0.2 mass % sodium hexametaphosphate aqueous solution to obtain a dispersion solution in which the powder was dispersed. The particle size distribution of the obtained dispersion solution was measured using Mastersizer 2000 manufactured by Malvern Instruments Ltd. (laser diffraction scattering particle size distribution measuring device) to obtain a volume-based cumulative particle size distribution curve. In the obtained cumulative particle size distribution curve, the volume particle size at a 50% cumulative point was referred to as a 50% cumulative volume particle size $D_{50}$ of the lithium-containing transition metal composite oxide. Furthermore, in the obtained cumulative particle size distribution curve, the maximum volume particle size was referred to as $D_{max}$, and the minimum volume particle size was referred to as $D_{min}$.

[Production of Lithium Secondary Battery]

Production of Positive Electrode For Lithium Secondary Battery

A paste-like positive electrode mixture was prepared by adding the lithium-containing transition metal composite oxide obtained by the manufacturing method described below, a conductive material (acetylene black), and a binder (PVDF) to achieve a composition of lithium-containing transition metal composite oxide:conductive material: binder=92:5:3 (mass ratio) and performing kneading thereon. During the preparation of the positive electrode mixture, N-methyl-2-pyrrolidone was used as an organic solvent.

The obtained positive electrode mixture was applied to a 40 μm-thick Al foil serving as a current collector and dried at 150° C. for 8 hours to obtain a positive electrode for a lithium secondary battery. The electrode area of the positive electrode for a lithium secondary battery was set to 1.65 cm².

Production of Lithium Secondary Battery (Coin Type Cell)

The following operation was performed in a glove box in a dry air atmosphere.

The positive electrode for a lithium secondary battery produced in "Production of Positive Electrode for Lithium Secondary Battery" was placed on the lower lid of a coin cell for coin type battery R2032 (manufactured by Hohsen Corp.) with the aluminum foil surface facing downward, and a laminated film separator (a heat-resistant porous layer (thickness 16 mm) was laminated on a polyethylene porous film) was placed thereon. 300 μL of an electrolytic solution was injected thereinto. The electrolytic solution used was prepared by dissolving, in a mixed solution of ethylene carbonate, dimethyl carbonate, and ethyl methyl carbonate in a ratio of 30:35:35 (volume ratio), LiPF$_6$ to achieve 1.0 mol/L.

Next, metal lithium was used as a negative electrode, and the negative electrode was placed on the upper side of the laminated film separator, covered with the upper lid via a gasket, and caulked by a caulking machine, whereby a lithium secondary battery (coin type battery R2032, hereinafter, sometimes referred to as "coin type battery") was produced.

[Discharge Rate Characteristics]

The discharge rate characteristics were calculated by measuring each of a 1.0C discharge capacity and a 5.0C discharge capacity. By dividing the 5.0C discharge capacity obtained by the measurement by the 1.0C capacity also obtained by the measurement, the discharge rate characteristics as an index of rate performance were calculated. In Table 1, "DCG. 1C" means the discharge capacity (unit: mAh/g) at 1.0C.

In addition, "DCG. 5C" means the discharge capacity (unit: mAh/g) at 5.0C.

Example 1

1. Manufacturing of Lithium-Containing Transition Metal Composite Oxide 1

After water was put in a reaction tank equipped with a stirrer and an overflow pipe, an aqueous solution of sodium hydroxide was added thereto, and the liquid was maintained at a temperature of 60° C.

An aqueous solution of nickel sulfate, an aqueous solution of cobalt sulfate, an aqueous solution of manganese sulfate, and an aqueous solution of aluminum sulfate were mixed so that the atomic ratio between nickel atoms, cobalt atoms, manganese atoms, and aluminum atoms became 87.5:9.5:2:1, whereby a mixed raw material solution was prepared.

Next, the mixed raw material solution and an aqueous solution of ammonium sulfate as a complexing agent were continuously added into the reaction tank under stirring, and an oxygen-containing gas was flowed while stirring the solution in the reaction tank at 750 rpm using a stirring blade. An aqueous solution of sodium hydroxide was appropriately added dropwise so that the pH of the solution in the reaction tank when measured at 40° C. became 12.3 to obtain nickel cobalt manganese aluminum composite hydroxide particles, and the particles were washed with a sodium hydroxide solution, thereafter dehydrated by a centrifuge, isolated, and dried at 105° C., whereby a nickel cobalt manganese aluminum composite hydroxide 1 was obtained.

The nickel cobalt manganese aluminum composite hydroxide 1 obtained as described above was calcined at 650° C. for 5 hours in a dry air atmosphere to obtain a nickel cobalt manganese aluminum composite oxide 1.

The obtained nickel cobalt manganese aluminum composite oxide 1 and lithium hydroxide powder were weighed to achieve Li/(Ni+Co+Mn+Al)=1.10 in terms of molar ratio and mixed. Thereafter, the mixture was calcined in an oxygen atmosphere at 760° C. for 5 hours to obtain a calcined product 1.

Next, the amount of lithium carbonate remaining in the calcined product 1 was measured by neutralization titration. Then, a slurry-like liquid was prepared by adding 1000 g of the calcined product 1 to 1500 g of pure water at 25° C., the slurry-like liquid was stirred for 10 minutes while being maintained at 25° C., and the obtained slurry-like liquid was subjected to centrifugal filtration to obtain a wet cake. Thereafter, the wet cake was dried in an air atmosphere at 150° C. for 12 hours to obtain a dried powder 1.

900 g of the dried powder 1 was collected, and 7.1 g of alumina nanopowder was applied thereto and calcined in an oxygen atmosphere at 760° C. for 10 hours to obtain a target lithium-containing transition metal composite oxide 1.

2. Evaluation of Lithium-Containing Transition Metal Composite Oxide 1

Compositional analysis of the obtained lithium-containing transition metal composite oxide 1 was performed, and when the composition was made to correspond to Composition Formula (I), x=0.00, y=0.095, z=0.02, and w=0.01 were obtained.

The γ1/γ2, R, BET specific surface area (m²/g), $D_{50}$ (μm), $D_{max}$ (μm), $D_{min}$ (μm), and crystallite size $L_{003}$ (Å) of the lithium-containing transition metal composite oxide 1, and the discharge rate characteristics (described as battery characteristics) of a lithium secondary battery using the lithium-containing transition metal composite oxide 1 are described in Table 1.

In addition, the temperature (° C.) of the washing solution used for washing, the temperature (° C.) of the slurry, the amount of residual lithium carbonate (g) contained in 1000 g of the calcined product 1, and the saturated dissolution amount (g) when lithium carbonate was dissolved in 100 g of the washing solution are described in Table 2.

Example 2

1. Manufacturing of Lithium-Containing Transition Metal Composite Oxide 2

900 g of the dried powder 1 obtained in Example 1 was collected and calcined in an oxygen atmosphere at 760° C. for 10 hours to obtain a target lithium-containing transition metal composite oxide 2.

2. Evaluation of Lithium-Containing Transition Metal Composite Oxide 2

Compositional analysis of the obtained lithium-containing transition metal composite oxide 2 was performed, and when the composition was made to correspond to Composition Formula (I), x=0.01, y=0.095, z=0.02, and w=0.01 were obtained.

The $\gamma 1/\gamma 2$, R, BET specific surface area (m$^2$/g), $D_{50}$ (μm), $D_{max}$ (μm), $D_{min}$ (μm), and crystallite size $L_{003}$ (Å) of the lithium-containing transition metal composite oxide 2, and the discharge rate characteristics (described as battery characteristics) of a lithium secondary battery using the lithium-containing transition metal composite oxide 2 are described in Table 1.

Example 3

1. Manufacturing of Lithium-Containing Transition Metal Composite Oxide 3

The nickel cobalt manganese aluminum composite oxide 1 obtained in Example 1 and lithium hydroxide powder were weighed to achieve Li/(Ni+Co+Mn+Al)=1.15 in terms of molar ratio and mixed. Thereafter, the mixture was calcined in an oxygen atmosphere at 720° C. for 10 hours to obtain a calcined product 3.

Next, the amount of lithium carbonate remaining in the calcined product 3 was measured by neutralization titration. Then, a slurry-like liquid was prepared by adding 1000 g of the calcined product 3 to 1325 g of pure water at 25° C., the slurry-like liquid was stirred for 10 minutes while being maintained at 25° C., and the obtained slurry-like liquid was subjected to centrifugal filtration to obtain a wet cake. Thereafter, the wet cake was dried in an air atmosphere at 150° C. for 12 hours to obtain a dried powder 3.

The dried powder 3 was calcined in an oxygen atmosphere at 760° C. for 10 hours to obtain a target lithium-containing transition metal composite oxide 3.

2. Evaluation of Lithium-Containing Transition Metal Composite Oxide 3

Compositional analysis of the obtained lithium-containing transition metal composite oxide 3 was performed, and when the composition was made to correspond to Composition Formula (I), x=0.02, y=0.095, z=0.02, and w=0.01 were obtained.

The $\gamma 1/\gamma 2$, R, BET specific surface area (m$^2$/g), $D_{50}$ (μm), $D_{max}$ (μm), $D_{min}$ (μm), and crystallite size $L_{003}$ (Å) of the lithium-containing transition metal composite oxide 3, and the discharge rate characteristics (described as battery characteristics) of a lithium secondary battery using the lithium-containing transition metal composite oxide 3 are described in Table 1.

In addition, the temperature (° C.) of the washing solution used for washing, the temperature (° C.) of the slurry, the amount of residual lithium carbonate (g) contained in 1000 g of the calcined product 3, and the saturated dissolution amount (g) when lithium carbonate was dissolved in 100 g of the washing solution are described in Table 2.

Example 4

1. Manufacturing of Lithium-Containing Transition Metal Composite Oxide 4

The nickel cobalt manganese aluminum composite oxide 1, lithium hydroxide powder, and tungsten oxide powder were weighed to achieve Li/(Ni+Co+Mn+Al)=1.10 and W/(Ni+Co+Mn+Al)=0.004 in terms of molar ratio and mixed. Thereafter, the mixture was calcined in an oxygen atmosphere at 760° C. for 5 hours to obtain a calcined product 4.

Next, the amount of lithium carbonate remaining in the calcined product 4 was measured by neutralization titration. Then, a slurry-like liquid was prepared by adding 1000 g of the calcined product 4 to 1083 g of pure water at 25° C., the slurry-like liquid was stirred for 10 minutes while being maintained at 25° C., and the obtained slurry-like liquid was subjected to centrifugal filtration to obtain a wet cake. Thereafter, the wet cake was dried in an air atmosphere at 150° C. for 12 hours to obtain a dried powder 4.

900 g of the dried powder 4 was collected, and 7.1 g of alumina nanopowder was applied thereto and calcined in an oxygen atmosphere at 760° C. for 10 hours to obtain a target lithium-containing transition metal composite oxide 4.

2. Evaluation of Lithium-Containing Transition Metal Composite Oxide 4

Compositional analysis of the obtained lithium-containing transition metal composite oxide 4 was performed, and when the composition was made to correspond to Composition Formula (I), x=0.01, y=0.095, z=0.02, and w=0.01 were obtained.

The $\gamma 1/\gamma 2$, R, BET specific surface area (m$^2$/g), $D_{50}$ (μm), $D_{max}$ (μm), $D_{min}$ (μm), and crystallite size $L_{003}$ (Å) of the lithium-containing transition metal composite oxide 4, and the discharge rate characteristics (described as battery characteristics) of a lithium secondary battery using the lithium-containing transition metal composite oxide 4 are described in Table 1.

In addition, the temperature (° C.) of the washing solution used for washing, the temperature (° C.) of the slurry, the amount of residual lithium carbonate (g) contained in 1000 g of the calcined product 4, and the saturated dissolution amount (g) when lithium carbonate was dissolved in 100 g of the washing solution are described in Table 2.

Example 5

1. Manufacturing of Lithium-Containing Transition Metal Composite Oxide 5

1000 g of the calcined product 4 was collected, a slurry-like liquid was prepared by adding 1000 g of pure water at 25° C., the slurry-like liquid was stirred for 10 minutes while being maintained at 25° C., and the obtained slurry-like liquid was subjected to centrifugal filtration to obtain a wet cake. Thereafter, the wet cake was dried in an air atmosphere at 150° C. for 12 hours to obtain a dried powder 5.

900 g of the dried powder 5 was collected, and 7.1 g of alumina nanopowder was applied thereto and calcined in an oxygen atmosphere at 760° C. for 10 hours to obtain a target lithium-containing transition metal composite oxide 5.

2. Evaluation of Lithium-Containing Transition Metal Composite Oxide 5

Compositional analysis of the obtained lithium-containing transition metal composite oxide 5 was performed, and when the composition was made to correspond to Composition Formula (I), x=0.00, y=0.095, z=0.02, and w=0.01 were obtained.

The $\gamma 1/\gamma 2$, R, BET specific surface area (m²/g), $D_{50}$ (μm), $D_{max}$ (μm), $D_{min}$ (μm), and crystallite size $L_{003}$ (Å) of the lithium-containing transition metal composite oxide 5, and the discharge rate characteristics (described as battery characteristics) of a lithium secondary battery using the lithium-containing transition metal composite oxide 5 are described in Table 1.

In addition, the temperature (° C.) of the washing solution used for washing, the temperature (° C.) of the slurry, the amount of residual lithium carbonate (g) contained in 1000 g of the calcined product 4, and the saturated dissolution amount (g) when lithium carbonate was dissolved in 100 g of the washing solution are described in Table 2.

Example 6

1. Manufacturing of Lithium-Containing Transition Metal Composite Oxide 6

1000 g of the calcined product 4 was collected, a slurry-like liquid was prepared by adding 3000 g of pure water at 25° C., the slurry-like liquid was stirred for 10 minutes while being maintained at 25° C., and the obtained slurry-like liquid was subjected to centrifugal filtration to obtain a wet cake. Thereafter, the wet cake was dried in an air atmosphere at 150° C. for 12 hours to obtain a dried powder 6.

900 g of the dried powder 6 was collected, and 7.1 g of alumina nanopowder was applied thereto and calcined in an oxygen atmosphere at 760° C. for 10 hours to obtain a target lithium-containing transition metal composite oxide 6.

2. Evaluation of Lithium-Containing Transition Metal Composite Oxide 6

Compositional analysis of the obtained lithium-containing transition metal composite oxide 6 was performed, and when the composition was made to correspond to Composition Formula (I), x=0.00, y=0.095, z=0.02, and w=0.01 were obtained.

The $\gamma 1/\gamma 2$, R, BET specific surface area (m²/g), $D_{50}$ (μm), $D_{max}$ (μm), $D_{min}$ (μm), and crystallite size $L_{003}$ (Å) of the lithium-containing transition metal composite oxide 6, and the discharge rate characteristics (described as battery characteristics) of a lithium secondary battery using the lithium-containing transition metal composite oxide 6 are described in Table 1.

In addition, the temperature (° C.) of the washing solution used for washing, the temperature (° C.) of the slurry, the amount of residual lithium carbonate (g) contained in 1000 g of the calcined product 6, and the saturated dissolution amount (g) when lithium carbonate was dissolved in 100 g of the washing solution are described in Table 2.

Example 7

1. Manufacturing of Lithium-Containing Transition Metal Composite Oxide 7

After water was put in a reaction tank equipped with a stirrer and an overflow pipe, an aqueous solution of sodium hydroxide was added thereto, and the liquid was maintained at a temperature of 50° C.

An aqueous solution of nickel sulfate, an aqueous solution of cobalt sulfate, an aqueous solution of aluminum sulfate were mixed so that the atomic ratio between nickel atoms, cobalt atoms, and aluminum atoms became 88:9:3, whereby a mixed raw material solution was prepared.

Next, the mixed raw material solution and an aqueous solution of ammonium sulfate as a complexing agent were continuously added into the reaction tank under stirring, and an oxygen-containing gas was flowed while stirring the solution in the reaction tank at 750 rpm using a stirring blade. An aqueous solution of sodium hydroxide was appropriately added dropwise so that the pH of the solution in the reaction tank when measured at 40° C. became 11.2 to obtain nickel cobalt aluminum composite hydroxide particles, and the particles were washed with a sodium hydroxide solution, thereafter dehydrated by a centrifuge, isolated, and dried at 105° C., whereby a nickel cobalt aluminum composite hydroxide 7 was obtained.

The nickel cobalt aluminum composite hydroxide 7 obtained as described above was calcined in an air atmosphere at 600° C. for 8 hours to obtain a nickel cobalt aluminum composite oxide 7.

The obtained nickel cobalt aluminum composite oxide 7 and lithium hydroxide powder were weighed to achieve Li/(Ni+Co+Al)=1.10 in terms of molar ratio and mixed. Thereafter, the mixture was calcined in an oxygen atmosphere at 720° C. for 6 hours to obtain a calcined product 7.

Next, the amount of lithium carbonate remaining in the calcined product 7 was measured by neutralization titration. Then, a slurry-like liquid was prepared by adding 1000 g of the calcined product 7 to 2846 g of pure water at 5° C., the slurry-like liquid was stirred for 20 minutes while being maintained at 5° C., and the obtained slurry-like liquid was subjected to centrifugal filtration to obtain a wet cake. Thereafter, the wet cake was dried at 150° C. for 8 hours to obtain a target lithium-containing transition metal composite oxide 7.

2. Evaluation of Lithium-Containing Transition Metal Composite Oxide 7

Compositional analysis of the obtained lithium-containing transition metal composite oxide 7 was performed, and when the composition was made to correspond to Composition Formula (I), x=0.01, y=0.09, z=0.00, and w=0.03 were obtained.

The γ1/γ2, R, BET specific surface area (m²/g), $D_{50}$ (μm), $D_{max}$ (μm), $D_{min}$ (μm), and crystallite size $L_{003}$ (Å) of the lithium-containing transition metal composite oxide 7, and the discharge rate characteristics (described as battery characteristics) of a lithium secondary battery using the lithium-containing transition metal composite oxide 7 are described in Table 1.

In addition, the temperature (° C.) of the washing solution used for washing, the temperature (° C.) of the slurry, the amount of residual lithium carbonate (g) contained in 1000 g of the calcined product 7, and the saturated dissolution amount (g) when lithium carbonate was dissolved in 100 g of the washing solution are described in Table 2.

Example 8

1. Manufacturing of Lithium-Containing Transition Metal Composite Oxide 8

After water was put in a reaction tank equipped with a stirrer and an overflow pipe, an aqueous solution of sodium hydroxide was added thereto, and the liquid was maintained at a temperature of 50° C.

An aqueous solution of nickel sulfate, an aqueous solution of cobalt sulfate, and an aqueous solution of manganese sulfate were mixed so that the atomic ratio between nickel atoms, cobalt atoms, and manganese atoms became 55:21:24, whereby a mixed raw material solution was prepared.

Next, the mixed raw material solution and an aqueous solution of ammonium sulfate as a complexing agent were continuously added into the reaction tank under stirring, and an oxygen-containing gas was flowed while stirring the solution in the reaction tank at 750 rpm using a stirring blade. An aqueous solution of sodium hydroxide was appropriately added dropwise so that the pH of the solution in the reaction tank when measured at 40° C. became 11.4 to obtain nickel cobalt manganese composite hydroxide particles, and the particles were washed with a sodium hydroxide solution, thereafter dehydrated by a centrifuge, isolated, and dried at 105° C., whereby a nickel cobalt manganese composite hydroxide 8 was obtained.

The nickel cobalt manganese composite hydroxide 8 obtained as described above was calcined at 850° C. for 8 hours in an air atmosphere to obtain a nickel cobalt manganese composite oxide 8.

The obtained nickel cobalt manganese composite oxide 8 and lithium hydroxide powder were weighed to achieve Li/(Ni+Co+Mn)=1.07 in terms of molar ratio and mixed. Thereafter, the mixture was calcined in an oxygen atmosphere at 850° C. for 6 hours to obtain a target lithium-containing transition metal composite oxide 8.

2. Evaluation of Lithium-Containing Transition Metal Composite Oxide 8

Compositional analysis of the obtained lithium-containing transition metal composite oxide 8 was performed, and when the composition was made to correspond to Composition Formula (I), x=0.04, y=0.21, z=0.24, and w=0.00 were obtained.

The γ1/γ2, R, BET specific surface area (m²/g), $D_{50}$ (μm), $D_{max}$ (μm), $D_{min}$ (μm), and crystallite size $L_{003}$ (Å) of the lithium-containing transition metal composite oxide 8, and the discharge rate characteristics (described as battery characteristics) of a lithium secondary battery using the lithium-containing transition metal composite oxide 8 are described in Table 1.

Example 9

1. Manufacturing of Lithium-Containing Transition Metal Composite Oxide 9

The amount of lithium carbonate remaining in the calcined product 7 obtained in Example 7 was measured by neutralization titration. Then, a slurry-like liquid was prepared by adding 100 g of the calcined product 7 to 284.6 g of pure water at 8° C., the slurry-like liquid was stirred for 20 minutes while being maintained at 8° C., and the obtained slurry-like liquid was subjected to centrifugal filtration to obtain a wet cake. Thereafter, the wet cake was dried at 150° C. for 8 hours to obtain a target lithium-containing transition metal composite oxide 9.

2. Evaluation of Lithium-Containing Transition Metal Composite Oxide 9

Compositional analysis of the obtained lithium-containing transition metal composite oxide 9 was performed, and when the composition was made to correspond to Composition Formula (I), x=0.02, y=0.09, z=0.00, and w=0.03 were obtained.

The γ1/γ2, R, BET specific surface area (m²/g), $D_{50}$ (μm), $D_{max}$ (μm), $D_{min}$ (μm), and crystallite size $L_{003}$ (Å) of the lithium-containing transition metal composite oxide 9, and the discharge rate characteristics (described as battery characteristics) of a lithium secondary battery using the lithium-containing transition metal composite oxide 9 are described in Table 1.

In addition, the temperature (° C.) of the washing solution used for washing, the temperature (° C.) of the slurry, the amount of residual lithium carbonate (g) contained in 1000 g of the calcined product 7, and the saturated dissolution amount (g) when lithium carbonate was dissolved in 100 g of the washing solution are described in Table 2.

Comparative Example 1

1. Manufacturing of Lithium-Containing Transition Metal Composite Oxide C1

The nickel cobalt manganese aluminum composite oxide 1 and lithium hydroxide powder were weighed to achieve Li/(Ni+Co+Mn+Al)=1.02 in terms of molar ratio and mixed. Thereafter, the mixture was calcined in an oxygen atmosphere at 760° C. for 5 hours to obtain a calcined product C1.

Next, the amount of lithium carbonate remaining in the calcined product C1 was measured by neutralization titration. Thereafter, the calcined product C1 was calcined in an oxygen atmosphere at 760° C. for 10 hours to obtain a target lithium-containing transition metal composite oxide C1.

2. Evaluation of Lithium-Containing Transition Metal Composite Oxide C1

Compositional analysis of the obtained lithium-containing transition metal composite oxide C1 was performed, and when the composition was made to correspond to Composition Formula (I), x=0.00, y=0.095, z=0.02, and w=0.01 were obtained.

The γ1/γ2, R, BET specific surface area (m²/g), $D_{50}$ (μm), $D_{max}$ (μm), $D_{min}$ (μm), and crystallite size $L_3$ (Å) of the lithium-containing transition metal composite oxide C1, and the discharge rate characteristics (described as battery characteristics) of a lithium secondary battery using the lithium-containing transition metal composite oxide C1 are described in Table 1.

Comparative Example 2

1. Manufacturing of Lithium-Containing Transition Metal Composite Oxide C2

After water was put in a reaction tank equipped with a stirrer and an overflow pipe, an aqueous solution of sodium hydroxide was added thereto, and the liquid was maintained at a temperature of 50° C.

An aqueous solution of nickel sulfate, an aqueous solution of cobalt sulfate, an aqueous solution of aluminum sulfate were mixed so that the atomic ratio between nickel atoms, cobalt atoms, and aluminum atoms became 82:15:3, whereby a mixed raw material solution was prepared.

Next, the mixed raw material solution and an aqueous solution of ammonium sulfate as a complexing agent were continuously added into the reaction tank under stirring, and an oxygen-containing gas was flowed while stirring the solution in the reaction tank at 350 rpm using a stirring blade. An aqueous solution of sodium hydroxide was appropriately added dropwise so that the pH of the solution in the reaction tank when measured at 40° C. became 11.5 to obtain nickel cobalt aluminum composite hydroxide particles, and the particles were washed with a sodium hydroxide solution, thereafter dehydrated by a centrifuge, isolated, and dried at 105° C., whereby a nickel cobalt aluminum composite hydroxide C2 was obtained.

The nickel cobalt aluminum composite hydroxide C2 obtained as described above was calcined in an air atmosphere at 600° C. for 8 hours to obtain a nickel cobalt aluminum composite oxide C2.

The obtained nickel cobalt aluminum composite oxide C2 and lithium hydroxide powder were weighed to achieve Li/(Ni+Co+Al)=1.15 in terms of molar ratio and mixed. Thereafter, the mixture was calcined in an oxygen atmosphere at 720° C. for 10 hours to obtain a calcined product C2.

Next, the amount of lithium carbonate remaining in the baked product C2 was measured by neutralization titration. Then, a slurry-like liquid was prepared by adding 1000 g of the baked product C2 to 2333 g of pure water at 25° C., the slurry-like liquid was stirred for 10 minutes while being maintained at 25° C., and the obtained slurry-like liquid was subjected to centrifugal filtration to obtain a wet cake. Thereafter, the wet cake was dried at 150° C. for 12 hours to obtain a target lithium-containing transition metal composite oxide C2.

2. Evaluation of Lithium-Containing Transition Metal Composite Oxide C2

Compositional analysis of the obtained lithium-containing transition metal composite oxide C2 was performed, and when the composition was made to correspond to Composition Formula (I), x=0.01, y=0.15, z=0.00, and w=0.03 were obtained.

The $\gamma 1/\gamma 2$, R, BET specific surface area (m$^2$/g), $D_{50}$ (μm), $D_{max}$ (μm), $D_{min}$ (μm), and crystallite size $L_{003}$ (Å) of the lithium-containing transition metal composite oxide C2, and the discharge rate characteristics (described as battery characteristics) of a lithium secondary battery using the lithium-containing transition metal composite oxide C2 are described in Table 1.

In addition, the temperature (° C.) of the washing solution used for washing, the temperature (° C.) of the slurry, the amount of residual lithium carbonate (g) contained in 1000 g of the calcined product C2, and the saturated dissolution amount (g) when lithium carbonate was dissolved in 100 g of the washing solution are described in Table 2.

Comparative Example 3

1. Manufacturing of Lithium-Containing Transition Metal Composite Oxide C3

The amount of lithium carbonate remaining in the calcined product 7 obtained in Example 7 was measured by neutralization titration. Then, a slurry-like liquid was prepared by adding 100 g of the calcined product 7 to 284.6 g of pure water at 45° C., the slurry-like liquid was stirred for 20 minutes while being maintained at 45° C., and the obtained slurry-like liquid was subjected to centrifugal filtration to obtain a wet cake. Thereafter, the wet cake was dried at 150° C. for 8 hours to obtain a target lithium-containing transition metal composite oxide C3.

2. Evaluation of Lithium-Containing Transition Metal Composite Oxide C3

Compositional analysis of the obtained lithium-containing transition metal composite oxide C3 was performed, and when the composition was made to correspond to Composition Formula (I), x=0.01, y=0.09, z=0.00, and w=0.03 were obtained.

The $\gamma 1/\gamma 2$, R, BET specific surface area (m$^2$/g), $D_{50}$ (μm), $D_{max}$ (μm), $D_{min}$ (μm), and crystallite size $L_{003}$ (Å) of the lithium-containing transition metal composite oxide C3, and the discharge rate characteristics (described as battery characteristics) of a lithium secondary battery using the lithium-containing transition metal composite oxide C3 are described in Table 1.

In addition, the temperature (° C.) of the washing solution used for washing, the temperature (° C.) of the slurry, the amount of residual lithium carbonate (g) contained in 1000 g of the calcined product 7, and the saturated dissolution amount (g) when lithium carbonate was dissolved in 100 g of the washing solution are described in Table 2.

Comparative Example 4

1. Manufacturing of Lithium-Containing Transition Metal Composite Oxide C4

The amount of lithium carbonate remaining in the calcined product 7 obtained n Example 7 was measured by neutralization titration. Then, a slurry-like liquid was prepared by adding 100 g of the calcined product 7 to 284.6 g of pure water at 15° C., the slurry-like liquid was stirred for 20 minutes while being maintained at 15° C., and the obtained slurry-like liquid was subjected to centrifugal filtration to obtain a wet cake. Thereafter, the wet cake was dried at 150° C. for 8 hours to obtain a target lithium-containing transition metal composite oxide C4.

2. Evaluation of Lithium-Containing Transition Metal Composite Oxide C4

Compositional analysis of the obtained lithium-containing transition metal composite oxide C4 was performed, and when the composition was made to correspond to Composition Formula (I), x=0.01, y=0.09, z=0.00, and w=0.03 were obtained.

The γ1/γ2, R, BET specific surface area (m²/g), $D_{50}$ (μm), $D_{max}$ (μm), $D_{min}$ (μm), and crystallite size $L_{003}$ (Å) of the lithium-containing transition metal composite oxide C4, and the discharge rate characteristics (described as battery characteristics) of a lithium secondary battery using the lithium-containing transition metal composite oxide C4 for a lithium secondary battery are described in Table 1.

In addition, the temperature (° C.) of the washing solution used for washing, the temperature (° C.) of the slurry, the amount of residual lithium carbonate (g) contained in 1000 g of the calcined product 7, and the saturated dissolution amount (g) when lithium carbonate was dissolved in 100 g of the washing solution are described in Table 2.

acteristics. In addition, Examples 1 to 7 and Example 9 in which the washing step to which the present invention was applied was performed had superior discharge rate characteristics to Comparative Example 3 in which the washing step to which the present invention was not applied was performed.

In Examples 1 to 6 in which the re-calcining step was performed after the washing step, lithium-containing transition metal composite oxides satisfying requirements (1) and (2) even when the temperature of the washing solution and the temperature of the slurry were 25° C. were obtained.

In Example 7, although the re-calcining step after the washing step was not performed, since the temperature of the washing solution in the washing step and the temperature of the slurry were 5° C., a lithium-containing transition metal composite oxide satisfying requirements (1) and (2)

TABLE 1

| | Composition | | | | xps | | | | | $L_{003}$ | Particle diameter | | | Battery characteristics 4.45 V | | |
|---|---|---|---|---|---|---|---|---|---|---|---|---|---|---|---|---|
| | x | y | z | w | γ1 | γ2 | γ1/γ2 | R | BET | (Å) | $D_{50}$ | $D_{max}$ | $D_{min}$ | DCG.1C | DCG.5C | 5C/1C |
| Example 1 | 0.01 | 0.09 | 0.02 | 0.02 | 0.018 | 0.037 | 0.483 | 0.610 | 0.25 | 1074 | 11.5 | 33.9 | 3.5 | 187.4 | 96.3 | 51.4% |
| Example 2 | 0.01 | 0.09 | 0.02 | 0.01 | 0.024 | 0.053 | 0.452 | 0.583 | 0.30 | 1088 | 12.9 | 44.9 | 3.5 | 186.2 | 69.0 | 37.0% |
| Example 3 | 0.02 | 0.09 | 0.02 | 0.02 | 0.047 | 0.057 | 0.830 | 0.688 | 0.22 | 1032 | 11.2 | 32.9 | 3.5 | 189.6 | 82.0 | 43.3% |
| Example 4 | 0.00 | 0.09 | 0.02 | 0.02 | 0.018 | 0.028 | 0.630 | 0.513 | 0.25 | 819 | 11.7 | 36.5 | 3.5 | 187.3 | 63.4 | 33.9% |
| Example 5 | 0.01 | 0.09 | 0.02 | 0.02 | 0.011 | 0.027 | 0.399 | 0.505 | 0.22 | 787 | 12.0 | 37.6 | 3.5 | 191.7 | 57.1 | 29.8% |
| Example 6 | 0.00 | 0.09 | 0.02 | 0.02 | 0.022 | 0.027 | 0.810 | 0.503 | 0.23 | 789 | 12.0 | 37.5 | 3.5 | 183.2 | 51.8 | 28.3% |
| Example 7 | 0.01 | 0.09 | 0.00 | 0.03 | 0.018 | 0.020 | 0.900 | 0.529 | 1.34 | 1019 | 13.0 | 53.3 | 1.2 | 185.5 | 71.1 | 38.3% |
| Example 8 | 0.04 | 0.21 | 0.24 | 0.00 | 0.020 | 0.026 | 0.774 | 0.503 | 1.98 | 875 | 3.4 | 11.6 | 1.0 | 196.1 | 183.8 | 93.7% |
| Example 9 | 0.02 | 0.09 | 0.00 | 0.03 | 0.018 | 0.019 | 0.975 | 0.555 | 1.43 | 1059 | 12.8 | 53.3 | 1.2 | 188.8 | 66.0 | 34.9% |
| Comparative Example 1 | 0.00 | 0.09 | 0.02 | 0.01 | 0.005 | 0.026 | 0.181 | 0.569 | 0.35 | 851 | 11.1 | 35.4 | 3.5 | 205.6 | 46.8 | 22.7% |
| Comparative Example 2 | 0.00 | 0.15 | 0.00 | 0.03 | 0.016 | 0.011 | 1.425 | 0.334 | 2.50 | 1074 | 11.0 | 33.3 | 3.8 | 184.2 | 39.0 | 21.2% |
| Comparative Example 3 | 0.01 | 0.09 | 0.00 | 0.03 | 0.017 | 0.013 | 1.258 | 0.356 | 1.44 | 1006 | 12.9 | 53.3 | 1.2 | 182.8 | 39.2 | 21.4% |
| Comparative Example 4 | 0.01 | 0.09 | 0.00 | 0.03 | 0.021 | 0.015 | 1.399 | 0.583 | 1.41 | 1032 | 12.9 | 47.5 | 1.2 | 187.7 | 49.0 | 26.1% |

TABLE 2

| | Temperature of washing solution [° C.] | Temperature of slurry [° C.] | Amount of lithium carbonate contained in 1000 g of calcined product [g/1000 g - calcined product] | Saturated solubility of lithium carbonate [g/100 g - pure water] |
|---|---|---|---|---|
| Example 1 | 25 | 25 | 9.7 | 1.30 |
| Example 2 | 25 | 25 | 9.7 | 1.30 |
| Example 3 | 25 | 25 | 11.3 | 1.30 |
| Example 4 | 25 | 25 | 10.9 | 1.30 |
| Example 5 | 25 | 25 | 10.9 | 1.30 |
| Example 6 | 25 | 25 | 14.3 | 1.30 |
| Example 7 | 5 | 5 | 19.1 | 1.48 |
| Example 8 | — | — | — | — |
| Example 9 | 8 | 8 | 19.1 | 1.45 |
| Comparative Example 1 | — | — | — | — |
| Comparative Example 2 | 25 | 25 | 13.1 | 1.30 |
| Comparative Example 3 | 45 | 45 | 19.1 | 1.13 |
| Comparative Example 4 | 15 | 15 | 19.1 | 1.39 |

As shown in the above results, Examples 1 to 9 to which the present invention was applied and which satisfied requirements (1) and (2) had excellent discharge rate charwas obtained. In Comparative Examples 2 and 4, the re-calcining step after the washing step was not performed, and the temperature of the washing solution and the temperature of the slurry were 25° C. and 15° C., respectively, so that lithium-containing transition metal composite oxides satisfying requirements (1) and (2) were not obtained.

INDUSTRIAL APPLICABILITY

According to the present invention, it is possible to provide a lithium-containing transition metal composite oxide for a lithium secondary battery having good output characteristics.

REFERENCE SIGNS LIST

1 Separator
2 Positive electrode
3 Negative electrode
4 Electrode group
5 Battery can
6 Electrolytic solution
7 Top insulator
8 Sealing body
10 Lithium secondary battery
21 Positive electrode lead
31 Negative electrode lead
X X-ray
32 Photoelectron
33, 34 Secondary particle

The invention claimed is:

1. A method for manufacturing a lithium-containing transition metal composite oxide including secondary particles that are aggregates of primary particles into or from which lithium ions are dopable or dedopable and represented by General Formula (I), the method comprising:
a mixing step of mixing a lithium compound and a metal composite compound containing at least nickel to obtain a mixture;
a baking step of baking the mixture to obtain a baked product; and
a washing step of washing the baked product,
wherein, in the mixing step, mixing is performed so that a molar ratio (Li/Me, a molar ratio of lithium to a total amount of metal elements excluding lithium) between lithium contained in the lithium compound and metal elements in the metal composite compound containing at least nickel exceeds 1, and
in the washing step, a temperature of a washing solution used for washing is set to −20° C. or higher and 40° C. or lower, and washing is performed in an amount of the washing solution used for washing such that a concentration of lithium carbonate in the washing solution in a case where it is assumed that a total amount of residual lithium carbonate contained in the baked product before washing is dissolved in the washing solution is 1/10 or more and 3 or less times a solubility of lithium carbonate in the washing solution at the temperature of the washing solution during the washing step, $$Li[Li_x(Ni_{(1-y-z-w)}Co_yMn_zM_w)_{1-x}]O_2 \quad (I)$$

(in Formula (I), $0 \le x \le 0.2$, $0 < y \le 0.5$, $0 \le z \le 0.8$, $0 \le w \le 0.1$, and $y+z+w<1$ are satisfied, and M represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn).

2. A method for manufacturing a lithium-containing transition metal composite oxide including secondary particles that are aggregates of primary particles into or from which lithium ions are dopable or dedopable and represented by General Formula (I), the method comprising:
mixing step of mixing a lithium compound and a metal composite compound containing at least nickel to obtain a mixture;
a baking step of baking the mixture to obtain a baked product; and
a washing step of washing the baked product,
wherein, in the mixing step, mixing is performed so that a molar ratio (Li/Me, a molar ratio of lithium to a total amount of metal elements excluding lithium) between lithium contained in the lithium compound and metal elements in the metal composite compound containing at least nickel exceeds 1, and
in the washing step, a temperature of a slurry containing the baked product and a washing solution used for washing is maintained at −20° C. or higher and lower than 10° C., and washing is performed in an amount of the washing solution used for washing such that a concentration of lithium carbonate in the washing solution in a case where it is assumed that a total amount of residual lithium carbonate contained in the baked product before washing is dissolved in the washing solution is 1/10 or more and 3 or less times a solubility of lithium carbonate in the washing solution at the temperature of the washing solution during the washing step, $$Li[Li_x(Ni(1-y-z-w)Co_yMn_zM_w)_{1-x}]O_2 \quad (I)$$

(in Formula (I), $0 \le x \le 0.2$, $0 < y \le 0.5$, $0 \le z \le 0.8$, $0 \le w \le 0.1$, and $y+z+w<1$ are satisfied, and M represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn).

3. A method for manufacturing a lithium-containing transition metal composite oxide including secondary particles that are aggregates of primary particles into or from which lithium ions are dopable or dedopable and represented by General Formula (I), the method comprising:
a mixing step of mixing a lithium compound and a metal composite compound containing at least nickel to obtain a mixture;
a baking step of baking the mixture to obtain a baked product; and
a washing step of washing the baked product,
wherein, in the mixing step, mixing is performed so that a molar ratio (Li/Me, a molar ratio of lithium to a total amount of metal elements excluding lithium) between lithium contained in the lithium compound and metal elements in the metal composite compound containing at least nickel exceeds 1, and
in the washing step, a temperature of a washing solution used for washing is set to −20° C. or higher and 40° C. or lower, washing is performed in an amount of the washing solution used for washing such that a concentration of lithium carbonate in the washing solution in a case where it is assumed that a total amount of residual lithium carbonate contained in the baked product before washing is dissolved in the washing solution is 1/10 or more and 3 or less times a solubility of lithium carbonate in the washing solution at the temperature of the washing solution, and a temperature of a slurry containing the baked product and the washing solution used for washing is maintained at −20° C. or higher and lower than 10° C., $$Li[Li_x(Ni(1-y-z-w)Co_yMn_zM_w)_{1-x}]O_2 \quad (I)$$

(in Formula (I), $0 \leq x \leq 0.2$, $0 < y \leq 0.5$, $0 \leq z \leq 0.8$, $0 \leq w \leq 0.1$, and $y+z+w<1$ are satisfied, and M represents one or more metals selected from the group consisting of Mg, Ca, Sr, Ba, Zn, B, Al, Ga, Ti, Zr, Ge, Fe, Cu, Cr, V, W, Mo, Sc, Y, Nb, La, Ta, Tc, Ru, Rh, Pd, Ag, Cd, In, and Sn).

\* \* \* \* \*